(12) United States Patent
Kitamura et al.

(10) Patent No.: US 6,544,369 B1
(45) Date of Patent: Apr. 8, 2003

(54) PROCESS FOR PRODUCING THIN FILM-LIKE MATERIAL HAVING DECORATIVE SURFACE

(75) Inventors: Yoshinori Kitamura, Tokyo (JP); Shigenobu Matsumoto, Tokyo (JP)

(73) Assignees: Japan Tobacco Inc., Tokyo (JP); JT Prosprint Co., Ltd., Tokyo (JP)

( * ) Notice: Subject to any disclaimer, the term of this patent is extended or adjusted under 35 U.S.C. 154(b) by 0 days.

(21) Appl. No.: 09/695,918

(22) Filed: Oct. 26, 2000

Related U.S. Application Data

(62) Division of application No. 09/523,322, filed on Mar. 10, 2000.

(30) Foreign Application Priority Data

Dec. 28, 1999 (JP) ............................................. 11-375003

(51) Int. Cl.[7] .......................... B44C 1/165; B32B 31/20; B32B 15/08; B41M 3/12; G02B 5/00
(52) U.S. Cl. ....................... 156/230; 156/231; 156/232; 156/233; 156/235; 156/240; 156/247; 156/289; 156/273.5; 427/148; 428/195; 428/344; 428/438; 428/542.2; 428/913.3; 428/914
(58) Field of Search ................................. 156/231, 232, 156/233, 234, 235, 237, 238, 239, 240, 241, 247, 277, 289, 275.5, 295.9; 427/146, 147, 148; 428/195, 543, 912.2, 542.2, 913.3, 458, 344, 914, 915

(56) References Cited

U.S. PATENT DOCUMENTS

| 2,559,649 A | * | 7/1951 | Little et al. ................. 156/231 |
| 3,990,932 A | * | 11/1976 | Dupire ........................ 156/231 |
| 4,215,170 A | * | 7/1980 | Vilaprinyo Oliva ......... 428/328 |
| 4,350,622 A | * | 9/1982 | Hiyoshi et al. .............. 524/831 |
| 4,473,422 A | * | 9/1984 | Parker et al. ................ 156/233 |
| 4,778,782 A | | 10/1988 | Ito et al. |
| 5,238,516 A | * | 8/1993 | van Suylekom et al. ..... 156/230 |
| 5,247,395 A | | 9/1993 | Martinez |
| 5,645,663 A | | 7/1997 | Nakayama et al. |
| 5,795,425 A | * | 8/1998 | Brault et al. ................. 156/235 |
| 5,830,609 A | | 11/1998 | Warner et al. |
| 5,885,490 A | | 3/1999 | Kawaguchi et al. |
| 5,900,309 A | | 5/1999 | Kitamura et al. |
| 5,993,960 A | | 11/1999 | Nakayama et al. |

* cited by examiner

Primary Examiner—J. A. Lorengo
(74) Attorney, Agent, or Firm—Birch, Stewart, Kolasch & Birch, LLP

(57) ABSTRACT

Thin film-like material that has printability, that can have unique surface patterns of various kinds, and that can have a design having an effect that has been never produced, and process of producing it are provided. The thin film-like material has a laminated structure in which an adhesive layer and a metal thin layer are laid in this order on the entire surface or parts of the surface of one or each of opposite sides of a base material A surface of the metal thin layer is formed by transfer process as a smooth surface having a mirror pattern, a surface having a mat pattern, a surface having a hairline pattern, a surface having an embossed pattern, a surface having a hologram pattern or a surface having two or more of those patterns combined appropriately.

26 Claims, 9 Drawing Sheets

PROCESS FOR PRODUCING THIN FILM-LIKE MATERIAL HAVING DECORATIVE SURFACE

This application is a divisional of co-pending application Ser. No. 09/523,322, filed on Mar. 10, 2000, the entire contents of which are hereby incorporated by reference.

BACKGROUND OF THE INVENTION

1. Field of the Invention

The present invention relates to thin film-like material and process of producing it. More Specifically, the present invention relates to thin film-like material that can bear various designs having unique effects, that can be incinerated as it is or made into regenerated paper if a base material is made of paper, and that can have a printable surface, and process of producing it by transfer process.

2. Prior Art

Thin film-like material that is a laminated member made of, for example, a paper or resin web and sheet as a base material, and a thin metal layer formed on a surface of the base material, for example, by vacuum deposition process is broadly used in various kinds of wrapping paper interior wall paper, book covers, Christmas cards, and various kinds of labels. Al deposited paper is a typical example of the thin film-like material.

There is also known thin film-like material that has a mirror surface with metallic luster. (Note that for convenience sake, "mirror surface" will be also referred to as "surface having a mirror pattern"), a surface having a mat pattern with metallic luster, a surface having a hairline pattern with metallic luster, a surface having an embossed pattern, a surface having a hologram pattern or the like, even if it includes a paper or resin web and sheet as a base mate real. There is also thin film-like material in which more than one of the above patterns are combined on the same plane with metallic luster.

Thin film-like material as described above is usually produced as follows:.

First, in the case of thin film-like material having a mirror surface, resin is applied thin on a base material, and metal such as Al is deposited directly on the resin by vacuum deposition process or sputtering process to form a thin metal layer. Here, in order that the formed metal thin layer may generate mirror-surface luster with a metallic tone, the metal thin layer needs to have a thickness of 50 nm or more, usually.

Thin fllm-like material having a mat pattern Is usually produced by preparing a metal web and sheet having a mat pattern formed on one side, and sticking a base material to the opposite side of the metal web and sheet by applying adhesive between to form a laminated structure.

Thin film-like material having a hairline pattern is produced by preparing a metal web and sheet having a hairline pattern formed on one side, and sticking a base material to the opposite side of the metal web and sheet by applying adhesive between to form a laminated structure. Alternately, it can be produced as follows: A resin web and sheet having a hairline pattern formed on a surface is prepared. Release agent is applied on the surface having a hairline pattern, and then metal is deposited on the applied release agent, for example, by vacuum deposition process to form a metal thin layer. After hot melt adhesive is applied on the thin metal layer, a base material is stacked on it and both are subjected to hot stamping. Then, the metal thin layer is transferred to the base material side by removing the metal web and sheet from the resin web and sheet.

Thin film-like material having an embossed pattern is produced by sticking a metal web and sheet and a base material together to form a laminated structure, and then embossed finish having a minute height is applied on the metal web and sheet.

If the metal web and sheet used in producing the above-described thin film-like materials having a mat pattern, a hairline pattern and an embossed pattern is too small in thickness, the metal web and sheet may wrinkle or tear while it is handled. Therefore, a metal web and sheet of about 6 to 20 µm in thickness is usually used.

Thin film-like material having a hologram pattern is generally produced as follows: release agent is applied on one side of, for example, a resin web and sheet. A protective layer is formed on it, and a thermoplastic resin layer is formed on the protective layer. Then, a hologram pattern is sculptured on the surface of the thermoplastic resin layer by pressure heating process, and then, for example, aluminum is deposited on it. Then, the resin web and sheet thus prepared is stuck on a base material with the Al deposited surface being placed on it, and then the resin web and sheet is removed.

In recent years, general consumers tend to think more of individuality. They tend to want goods with a design having a more individual and novel effect.

This means that manufacturers are required to provide goods with a design having a discriminative effect in contrast to other goods.

The easiest way to impart a design having a new effect to the above-described thin film-like material having a surface pattern of various kinds is to print a desired pattern on the patterned surface to produce a combination of the original pattern and the printed pattern. For example, the combination is such that the original pattern has disappeared due to the printed pattern at some portions and remains visible at the other portions.

However, the above way has a problems. The original surface pattern of the thin film-like material is formed on a thin metal layer as described above. The pattern formed on the thin metal layer does not disappear easily even if a new pattern is printed thereon. Therefore, a satisfactory change of effect of design is not always obtained.

Further, the conventional thin film-like material using a metal web and sheet contains large amount of metal, because the metal web and sheet is large in thickness (about 6 to 20 µm). Therefore, the thin film-like material is hard to incinerate as it is. Further, in order to reuse the thin film-like material by making it into regenerated paper, the thin film-like material needs to be separated into the base material and metal web and sheet, for example, by being soaked in alkali solvent capable of dissolving the adhesive so that only the base material may be subjected to regeneration.

Further, in the conventional thin film-like material produced by depositing, for example, aluminum directly on a base material by vacuum deposition process, minute roughness of the surface of the base material reappear on the deposited aluminum as they are. Therefore, in order to produce thin film-like material having a mirror-like surface, a base material whose surface has fairly high smoothness needs to be used. For example, when a base material of woven or nonwoven fabric, or a base material having a rough surface is used thin film-like material having a mirror surface is hard to obtain. To sum up, the kinds of base material that can be used to produce the thin film-like material having a mirror surface are limited.

Further, a mirror surface can be formed using a base material of paper, to be sure. The luminance of the formed mirror surface depends on layer forming conditions, but the glossiness of the formed mirror surface is about 700% when it is measured in accordance with a method stipulated as method 5 of JIS-Z-8741. It is very difficult to raise the glossiness, for example, over 1000%.

OBJECTS AND SUMMARY OF THE INVENTION

An object of the present invention is to provide thin film-like material on which unique patterns of various kinds that would meet the recent demand can be formed easily and which can have a design having an effect that has never been produced, and process of producing it.

Another object of the present invention is to provide thin film-like material on which a desired pattern can be formed easily regardless of the kind of a base material, which uses only a very small amount of metal and therefore can be incinerated as it is, which can have a mirror surface that exhibits a glossiness of much higher than 1500% when measurement is performed in accordance with the above-mentioned method, and which can be broken and turned into regenerated paper when a base material is made of paper; and process of producing that thin film-like material.

in order to attain the above objects, the present invention provides thin film-like material having a laminated structure in which an adhesive layer and a metal thin layer are laid in this order on the entire surface or parts of the surface of one or each of opposite sides of a base material, wherein a surface of the metal thin layer is a smooth surface having a mirror pattern, a surface having a mat pattern, a surface having a hairline pattern, a surface having an embossed pattern, a surface having a hologram pattern or a surface having more than one of those patterns combined appropriately (hereinafter referred to as "thin film-like material A");

thin film-like material having a laminated structure in which an adhesive layer, a metal thin layer and a resin layer are laid in this order on the entire surface or parts of the surface of one or each of opposite sides of a base material, wherein a surface of the metal thin layer is a smooth surface having a mirror pattern, a surface having a mat pattern, a surface having a hairline pattern, a surface having an embossed pattern, a surface having a hologram pattern or a surface having more than one of those patterns combined appropriately, and a surface of the resin layer is a surface having a mat pattern, a surface having a hairline pattern, a surface having an embossed pattern, a surface having a hologram pattern or a surface having more than one of those patterns combined appropriately (hereinafter referred to as "thin film-like material B");

thin film-like material having a laminated structure in which a resin layer is laid on the entire surface or parts of the surface of one or each of opposite sides of a base material, wherein a surface of the resin layer is a surface having a mat pattern, a surface having an embossed pattern, a surface having a hairline pattern, a surface having a hologram pattern or a surface having more than one of those patterns combined appropriately (hereinafter referred to as "thin film-like material C");

thin film-like material having a laminated structure in which at least two resin layers are laid on parts of the surface of one or each of opposite sided of a base material, wherein a lower resin layer is made of colored resin, an upper resin layer is made of transparent or translucent resin, and at least a surface of the upper resin layer is a surface having a mat pattern, a surface having an embossed pattern, a surface having a hairline pattern, a surface having a hologram pattern or a surface having more than one of those patterns combined appropriately (hereinafter referred to as "thin film-like material D");

translucent thin film-like material having a laminated structure in which a transparent or translucent adhesive layer and an Al thin layer of 3 to 10 nm in thickness are laid in this order on the entire surface or parts of the surface of one or each of opposite sides of a transparent or translucent base material (hereinafter referred to as "thin film-like material E"); and thin film-like material wherein a metal thin layer is formed on the uppermost layer of the laminated structure of the thin film-like material A, B, C or D with an adhesive layer between (hereinafter referred to as "thin film-like material F").

The present invention further provides process of producing the thin film-like material A comprising a step of forming a metal thin layer on a surface of a transfer resin film of which at least one surface is a smooth surface having a mirror pattern, a surface having a mat pattern, a surface having a hairline pattern, a surface having an embossed pattern, a surface having a hologram pattern or a surface having more than one of those patterns combined appropriately, a step of laying the transfer resin film on a base material with the surface of the metal thin layer side being placed on the base material and adhesive being applied between, and then curing the adhesive, and a step of forming a laminated structure by transferring the metal thin layer to the base material side by removing the transfer resin film;

process of producing the thin film-like material B, comprising a step of forming a metal thin layer on a first transfer resin film of which at least one surface is a smooth surface having a mirror pattern, a surface having a mat pattern, a surface having a hairline pattern, a surface having an embossed pattern, a surface having a hologram pattern or a surface having more than one of those patterns combined appropriately, a step of laying the first transfer resin film on a base material with the surface of the metal thin layer side being placed on the base material and adhesive being applied between, and then curing the adhesive, a step of forming a laminated sheet including the metal thin layer by transferring the metal thin layer to the base material side by removing the first transfer resin film, a step of applying uncured resin on a surface of a second transfer resin film of which at least one surface is a surface having a mat pattern, a surface having a hairline pattern, a surface having an embossed pattern, a surface having a hologram pattern or a surface having more than one of those patterns combined appropriately, a step of laying the second transfer resin film on the laminated sheet with the surface of the uncured resin side being placed on the surface of the metal thin layer side, and then curing the uncured resin to form a resin layer, and a step of forming a laminated structure by transferring the resin layer to the base material side by removing the second transfer resin film;

process of producing the thin film-like material C, comprising a step of applying uncured resin on a surface of a transfer resin film of which at least one surface is a surface having a mat pattern, a surface having a hairline pattern, a surface having an embossed pattern, a surface having a hologram pattern or a surface having more than one of those patterns combined appropriately, a step of laying the transfer resin film on a base material with the surface of the uncured resin side being placed on the base material, and then curing the uncured resin to form a resin layer, and a step of forming a laminated structure by transferring the metal thin film layer to the base material side by removing the transfer resin film;

process of producing the thin film-like material D, comprising a step of applying uncured colored resin on the entire surface or parts of the surface of a first transfer resin film of which at least one surface is a smooth surface having a mirror pattern, a surface having a mat pattern, a surface having a hairline pattern, a surface having an embossed pattern, a surface having a hologram pattern or a surface having more than one of those patterns combined appropriately, a step of laying the first transfer resin film on a base material with the surface of the uncured colored resin side being placed on the base material, then curing the uncured colored resin to form a colored resin layer, and then forming a base sheet by transferring the colored resin layer to the base material side by removing the first transfer resin film, a step of applying uncured transparent or translucent resin on a surface of a second transfer resin film of which at least one surface is a surface having a mat pattern, a surface having a hairline pattern, a surface having an embossed pattern, a surface having a hologram pattern or a surface having more than one of those patterns combined appropriately, a step of laying the second transfer resin film on the base sheet with the surface of the uncured resin side being placed on the surface of the colored resin layer side, and then curing the uncured resin to form a resin layer, and a step of forming a laminated structure by transferring the resin layer to the base sheet side by removing the second transfer resin film;

process of producing the translucent thin film-like material E, comprising a step of forming an Al thin layer of 3 to 10 nm in thickness on a surface of a transfer resin film, a step of laying the transfer resin film on a transparent or translucent base material with the surface of the Al thin layer side being placed on the base material and transparent or translucent adhesive being applied between, and then curing the adhesive, and a step of forming a laminated structure by transferring the Al thin layer to the base material side by removing the transfer resin film; and process of producing the thin film-like material F, comprising a step of forming a metal thin layer on a surface of a transfer resin film of which at least one surface that is a smooth surface having a mirror pattern, a surface having a mat pattern, a surface having a hairline pattern, a surface having an embossed pattern, a surface having a hologram pattern or a surface having more than one of those patterns combined appropriately, a step of laying the transfer resin film on the laminated structure of the thin film-like material A, B, C or D with the surface of the metal thin layer side being placed on adhesive that is applied on parts of a surface of the laminated structure, and then curing the adhesive to form an adhesive layer, and a step of forming a new laminated structure by transferring the metal thin layer by removing the transfer resin film.

DETAILED DESCRIPTION OP THE INVENTION

Thin film-like materials of the present invention and process of producing them will be described below based on the drawings.

First, thin film-like material A will be described.

Figure 1:
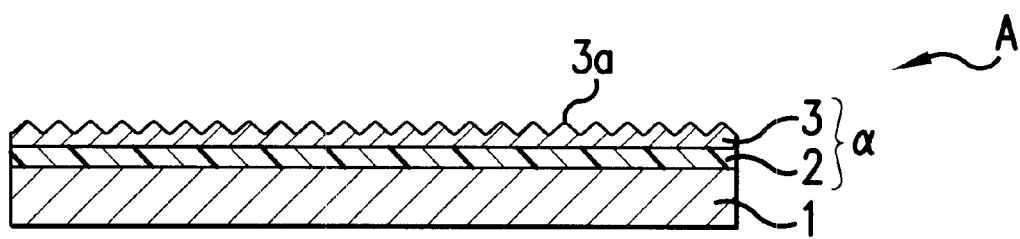
FIG. 1 is a cross-sectional view showing layer structure of thin film-like material A of the present invention.

FIG. 1 shows basic layer structure of the thin film-like material A. The thin film-like material A has a laminated structure α wherein an adhesive layer 2 and a metal thin layer 3 are laid on a base material 1 in this order and the metal thin layer 3 is stuck on a surface of the base material 1 (in FIG. 1, only on one side) with the adhesive layer 2 between.

A surface 3a of the metal thin layer 3 can be a surface of various kinds such as a smooth mirror surface (smooth surface having a mirror pattern), a surface having a mat pattern, a surface having a hairline pattern, a surface having an embossed pattern a surface having a hologram pattern, and a surface having more than one of those patterns appropriately combined on the same plane such as a surface consisting of mirror-surface portions and portions having a hologram pattern.

The base material 1 is not limited to a particular one. It can be made of, for example, the following substances:

Paper made from natural pulp synthetic paper made from, for example, polypropylene or polyethylene; resin film such as polypropylene film, polyester film, polyethylene film, polycarbonate film, polyvinyl chloride film, polystyrene film, cellophane film, polyethylene haphthalate film, ethylene-vinyl alcoholate film, polyacrylonitrile film, cellulose acetate butyrate film, nylon film, polyvinyl alcohol film, ethylene-vinyl acetate copolymer film, alanide film, polyimide film, polyurethane film, polymethyl methacryl film, poly-lactic acid film and polycaprolactone film; non-woven fabric made from pulp synthetic resin, biodegradable plastic resin or the like; biodegradable plastic film made from aliphatic polyester resin, starch or the like; and woven fabric made of natural or synthetic fiber of various kinds.

The base material may be transparent or translucent. It may also be a colored or opaque material containing desired pigment.

The adhesive layer 2 is to stick and fix the base material 1 and the metal thin layer 3 together, and made of cured resin adhesive capable of firmly sticking the base material 1 and the metal thin layer 3 together.

As the resin adhesive of that kind, the following resin adhesives can be used:

Two-part curing type resin adhesive made from, for example, one resin chosen from polyurethane resin, epoxy resin and acrylic resin, or a resin produced by appropriately mixing two or more resins chosen from those resins; one-part curing type resin adhesive made from one resin chosen from ethylene acrylamide resin, ethylene-vinyl acetate resin, ethylene acrylate copolymer resin, vinyl acetate resins acrylic resin, solventless polyurethane resin, poly-lactic acid resin and polycaprolactone resin, or a resin produced by appropriately mixing two or more resins chosen from those resin; electron beam curing type resin adhesive made from one resin chosen from urethane acrylate resin, epoxy acrylate resin, polyester acrylate resin and mono-. di-, tri-, or tetra-hexaacrylate resin, or a resin produced by appropriately mixing two or more resins chosen from those resins; ultraviolet curing type resin made from acrylate resin; and the like.

The above resin adhesives may be blended with carbon black or another pigment, or dye. When transparent or translucent resin adhesive blended with, for example, carbon black is used, a black opaque adhesive layer 2 capable of blocking out light is formed.

Metal for forming the metal thin layer 3 is not limited to a particular one. For example Au, Al, Ag, Zn, Cu, Sn, Si and the like can be used. Among them, Al is preferable because of its price in addition, Al can be easily formed into a metal thin layer in the producing process described later, and when the surface 3a is made into a mirror surface, Al can impart high glossiness to the mirror surface.

Figure 2:
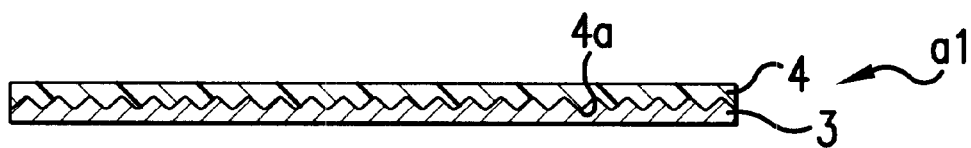
FIG. 2 is a cross-sectional view showing layer structure of a laminated sheet $a_1$ used in producing the thin film-like material A.

The thin film-like material A can be produced as follows:

First, as shown in FIG. 2, a laminated sheet $a_1$ is produced by forming a metal thin layer 3 directly on a surface 4a of a transfer resin film 4.

The resin film 4 used here is a film at least one surface of which (the surface 4a in FIG, 2) has a pattern that is in a negative-to-positive or positive-to-negative relationship with respect to a to-be-produced surface pattern of the thin film-like material A. Specifically, at least one surface of the resin film 4 is a smooth mirror surface (smooth surface having a mirror pattern), a non-smooth surface having a mat pattern, a non-smooth surface having a hairline pattern, a non-smooth surface having an embossed pattern, a non-smooth surface having a hologram pattern, or a non-smooth surfaced having more than one of the above patterns combined appropriately on the same plane.

Since the metal thin layer 3 formed on the surface 4a is to be transferred to the base material side in a manner described later, it is desirable that the resin film 4 does not exert a strong adhesive power to the metal thin layer 3. For example, biaxially oriented polypropylene film not treated with corona discharge is good to use as the resin film 4.

The process of forming the metal thin layer 3 is not limited to a particular one, but physical process such as vacuum deposition process, sputtering process and electron beam process is desirable. Particularly when the metal thin layer 3 is made from Al, vacuum deposition process is desirable.

The thickness of the metal thin layer 3 is not limited to a particular one, but too large thickness does not improve a to-be-produced surface pattern of the thin film-like material A. In addition, too large thickness is uneconomical because it requires a larger amount of metal. Further, the thin film-like material having the metal thin layer 3 of too large thickness cannot be incinerated as it is. Thus, the thickness that at least allows a metallic color tone to be developed and which can form a desired pattern simultaneously, specifically, the thickness in the range of 20 to 1000 nm is desirable.

Next, the laminated sheet $a_1$ and a base material are integrated with the above-mentioned adhesive between.

Figure 3:
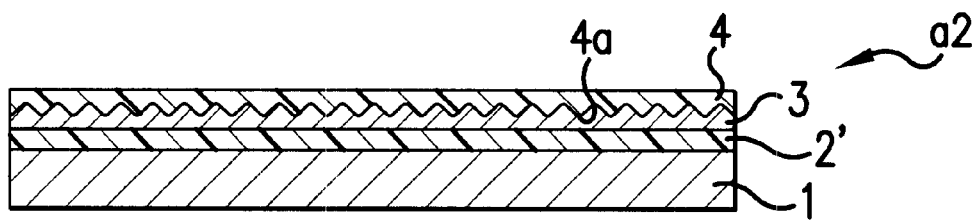
FIG. 3 is a cross-sectional view showing layer structure of a laminated sheet $a_2$ produced by sticking the laminated sheet $a_1$ on a base material.

Specifically, as shown in FIG. 3, resin adhesive 2' as mentioned above is applied on a surface of a base material 1, and before the resin adhesive 2' hardens, the laminated sheet $a_1$ is laid on the base material with the surface of the metal thin layer 3 side being placed on the resin adhesive 2' side. Thus, a laminated sheet $a_2$ is produced. The resin adhesive 2' may be applied on the surface of the metal thin layer 3 of the laminated sheet $a_2$ instead of the surface of the base material.

Then the adhesive 2' is cured, for example, by subjecting the laminated sheet $a_2$ to contact bonding with heating. When two-part curing type adhesive is used as the resin adhesive 2', heating is performed for a determined time. When one-part curing type solventless adhesive is used as the resin adhesive 2', the laminated sheet $a_2$ is produced using the warmed resin adhesive, then the laminated sheet $a_2$ is made to pass between warmed rollers for thermal contact bonding, and then it is cooled. When emulsion type adhesive is used as the resin adhesive 2', solvent and water is made to remove, for example, by heating, after the laminated sheet $a_2$ is contact-bonded. When electron beam curing type or ultraviolet curing type adhesive is used as the resin adhesive 2', an electron beam or ultraviolet rays are applied. It is to be noted that when the ultraviolet curing type adhesive is used, a transparent base material is used and ultraviolet rays are applied from the base material side.

Figure 4:
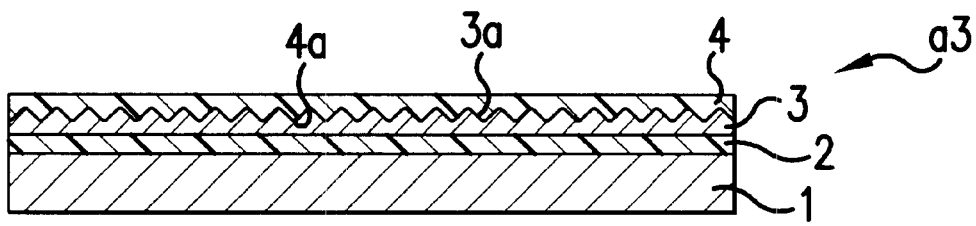
FIG. 4 is a cross-sectional view showing layer structure of a laminated sheet $a_3$ produced by curing adhesive in the laminated sheet $a_2$.

As a result, as shown in FIG. 4, a laminated sheet $a_3$ is produced wherein the base material 1 and the metal thin layer 3 are stuck and fixed together and integrated, with an adhesive layer 2 of cured adhesive 2' between.

Next, the resin film 4 is removed from the laminated sheet $a_3$. The surface 4a of the resin film 4 adheres to the metal thin layer 3 only physically. The adhesive power exerting between them is far smaller than the bonding power between the metal thin layer 4 and the adhesive layer 2. Therefore, only the resin film 4 can be easily removed from the metal thin layer 3 without the adhesive layer 2 being separated from the metal thin layer 3. As a result, the thin film-like material A shown in FIG. 1 is obtained wherein a laminated structure α consisting of the adhesive layer 2 and the metal thin layer 3 is formed on the base material and the surface 3a of the metal thin layer 3 is exposed.

The surface 3a of the metal thin layer 3 is now a mirror surface (surface having a mirror pattern) or a surface having a non-smooth pattern of various kinds transferred from the surface of the resin film 4, wherein the transferred pattern of the surface 3a has a pattern that is in a negative-to-positive or positive-to negative relationship with respect to a original pattern of the resin film 4.

Figure 5:
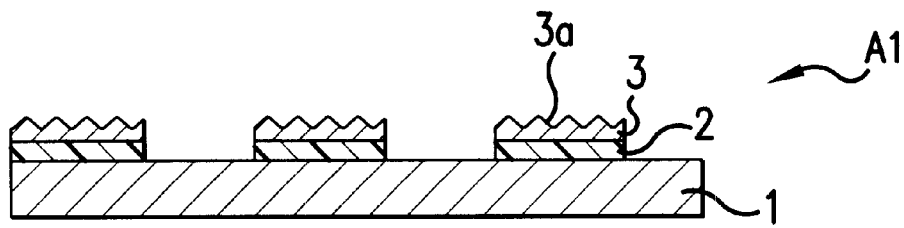
FIG. 5 is a cross-sectional view showing layer structure of another thin film-like material $A_1$.

FIG. 5 shows layer structure of thin film-like material $A_1$ that belongs in a group of the thin film-like material A. In the thin film-like material $A_1$, an adhesive layer 2 is formed on parts of a surface of a base material 1 as a desired two-dimensional pattern, and a metal thin layer 3 is formed only on the adhesive layer 2. Thus, the metal thin layer 3 is formed on parts of a surface of the base material 1 as a desired two-dimensional pattern.

In the thin film-like material $A_1$, the surface 3a of the metal thin layer 3 has a pattern of various kinds with a metallic color tone, and at the same time the metal thin layer 3 itself creates a kind of two-dimensional pattern on the surface of the base material. Thus, in the thin film-like material $A_1$, an effect of another design is added to the effect of the design of the thin film-like material A of FIG. 1.

The thin film-like material $A_1$ can be produced by producing a laminated sheet $a_2$ of FIG. 3 in the following manner: Adhesive 2' in applied on a base material 1 in accordance with a desired two-dimensional pattern. Then, a laminated sheet $a_1$ is laid on the base material with a metal thin layer 3 side being placed on the adhesive 2' side. Then, the adhesive 2' is cured and a resin film 4 is removed. Here, the adhesive 2' may be applied on the surface of the metal thin layer 3 of the laminated sheet $a_1$ in accordance with a desired pattern, instead of being applied on the surface of the base material.

When the resin film 4 is removed, the parts of the metal thin layer which stick to the adhesive layer 2' that is formed in the state of a two-dimensional pattern are left on the adhesive layer side, and the parts of the metal thin layer which do not stick to the adhesive layer 2' are removed together with the resin film 4. Thus, the metal thin layer is left on the base material 1 in the state of the same two-dimensional pattern as the adhesive layer is formed.

In the thin film-like material A and thin film-like material $A_1$, the surface 3a of the metal thin layer 3 is metal. Therefore, the printing process applicable to them is limited.

Figure 6:
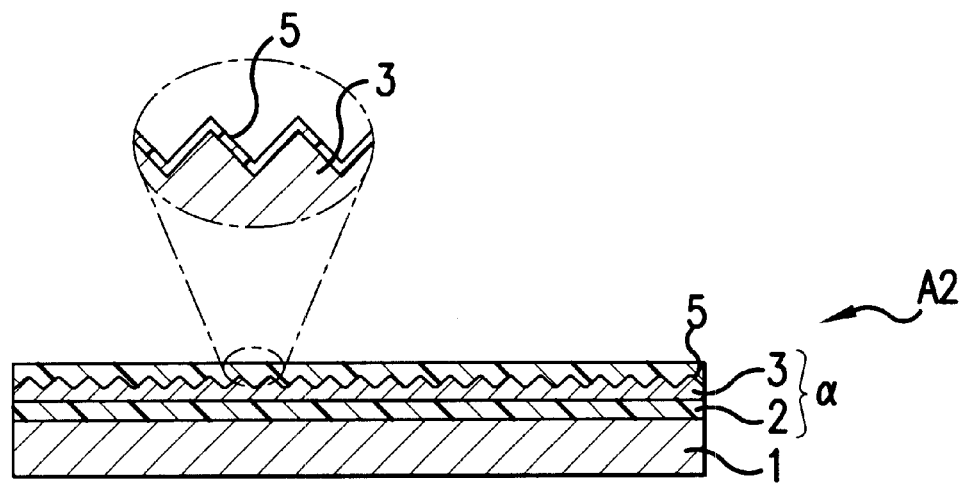
FIG. 6 is a cross-sectional view showing layer structure of another thin film-like material $A_2$.

In this view, the present invention provides thin film-like material $A_2$ shown in FIG. 6, wherein a resin coating film 5 for imparting printability is further formed on the surface 3a of the metal thin layer 3.

The resin coating film 5 is formed by applying resin coating material on the surface of the metal thin layer 3 of, for example, thin film-like material A ($A_1$) that has been produced by forming a laminated structure α a by removing a resin film 4 from a laminated sheet $a_3$ (FIG. 6). Here, the thickness of the resin coating film is not limited to a particular one. For example, the resin coating film may have a thickness such that a non-smooth pattern of the surface 3a of the metal thin layer 3 is buried under the resin coating film.

Any resin coating material may be used for forming the resin coating film 5, as long as it can impart printability. For example, one coating material chosen from urethane resin, polyester resin, chlorinated polyvinyl acetate resin, pyroxylin resin, acrylic resin, polyamide resin and maleic acid resin, or a coating material produced by appropriately mixing two or more resins chosen from those resins can be used. The above coating materials may be any of solvent type, aqueous type, and water-soluble type.

A printed pattern including any color and form can be formed on the thin film-like material $A_2$ having the above kind of resin coating film 5. Thus, in the thin film-like material $A_2$, an effect of another design by the printed pattern is added to the effect of the original design of the surface of the thin metal layer of the thin film-like material A ($A_1$).

The resin coating film 5 may be transparent or translucent. It may also be colored by being blended with pigment.

If the resin coating film 5 is formed from resin coating material that is blended with transparent or translucent fine particles of, for example, silicic anhydride, polyethylene resin, polyester resin or the like, part of the particles are out on the surface of the resin coating film 5, and irregular reflection of light caused by those particles generates a mat tone on the surface of the resin coating film 5. If transparent resin or cellophane tape is further applied on parts of that surface of the resin coat 5, the mat tone disappears at those parts of the surface, so that the surface pattern of the metal thin layer 3 can be seen at those parts. Thus, thin film-like material with a design having a very unique effect is obtained.

Figure 7:
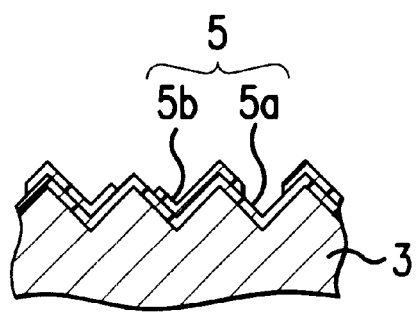
FIG. 7 is a cross-sectional view showing a resin coating film for imparting printability having two-layer structure.

Further, as shown in FIG. 7, if a resin coating film 5 having a two-layer structure is formed by applying, for example, transparent resin coating material on the entire surface of the metal thin layer to form a coating film 5a and then applying colored resin coating material on the coating film 5a in accordance with a desired two-dimensional pattern to form a colored coating film 5b, the thin film-like material exerting an effect of a design is obtained.

If in the laminated sheet a of FIG. 2 the resin film 4 has a surface 4a having a very high smoothness, the smoothness of the surface of the film is transferred to the surface of the metal thin layer 3, as it is. As a result, the metal thin layer 3 has a mirror surface.

Therefore, although the metal thin layer 3 is very thin, that is, 20 to 100 nm in thickness, the glossiness of that surface (mirror surface) is very high. Specifically, it exhibits a glossiness of 1000 to 2000% when measurement is performed in accordance with a method stipulated as method 5 of JIS-Z-8741. Thus, the thin film-like material has a mirror surface of high glossiness only with the use of a small amount of metal.

The portion having the metal thin layer having a thickness of 20 to 100 nm exhibits a moisture permeability of 300 g/m$^2$·24 hr or lower when measurement is performed in accordance with a method stipulated in JIS-Z-0208.

In any of the above described thin film-like materials A, $A_1$, $A_2$, the laminated structure α consisting of an adhesive layer and a metal thin layer is formed on one side of the base material 1, but the present invention is not limited to that formation. The laminated structure α may be formed on each of the opposite sides of the base material 1.

Figure 8:
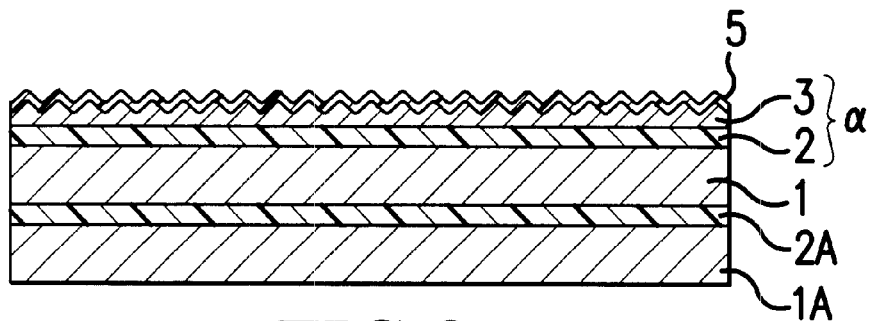
FIG. 8 is a cross-sectional view showing thin film-like material $A_2$ having a protective sheet on one side.

If thin film-like material has a formation wherein a laminated structure α is formed on one side of a base material 1 and a protective sheet 1A is stuck on the opposite side of the base material 1 with an adhesive layer 2A between, the thin film-like material can be used, for example, as wall paper with a design having a unique effect, by removing the protective sheet 1A so that the thin film-like material can be stuck on a wall (FIG. 8).

Next, thin film-like material B and process of producing it will be described.

Figure 9:
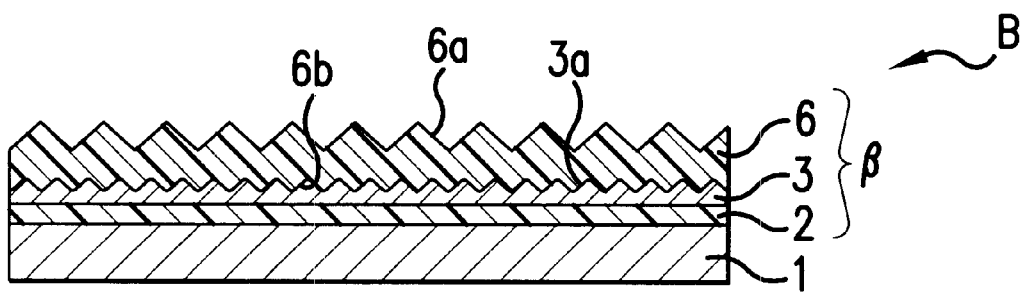
FIG. 9 is a cross-sectional view showing layer structure of thin film-like material B of the present invention.

FIG. 9 shows basic layer structure of the thin film-like material B. The thin film-like material B has a laminated structure β wherein an adhesive layer 2, a metal thin layer 3, and a resin layer 6 described later are laid on a base material 1 in this order The base material 1 and the adhesive layer 2 may be made of the same substances as those of the above-described thin film-like material A are made of. It is desirable that the metal thin layer 3 is an Al deposited layer, like the metal thin layer of the thin film-like material A. The thickness of the metal thin layer is about 20 to 100 nm.

A surface 3a of the metal thin layer 3 is a smooth mirror surface (smooth surface having a mirror pattern), a surface having a mat pattern, a surface having a hairline pattern, a surface having an embossed pattern, a surface having a hologram pattern, or a surface having more than one of those patterns combined appropriately. A surface 6a of the resin layer 6 is a surface having a mat pattern, a surface having a hairline pattern, a surface having an embossed pattern, a surface having a hologram pattern, or a surface having more than one of those patterns combined appropriately.

Therefore, in the thin film-like material B, also the opposite surface 6b of the resin layer 6 has a pattern. For example, if the surface 3a of tee metal thin layer 3 is a mirror surface (surface having a mirror pattern), the surface 6b of the resin layer 6 is a mirror surface (surface having a mirror pattern). If the surface 3a of the metal thin layer 3 has a non-smooth pattern as mentioned above, the surface 6b of the resin layer 6 has a non-smooth pattern that is in a negative-to-positive or positive-to-negative relationship with respect to the non-smooth pattern of the surface 3a.

Here, the resin layer 6 may be transparent or translucent regarding white light, or may be colored. The resin layer 6 may be made from resin blended with pigment, like the resin used in the thin film-like material A.

For example, if the resin, layer 6 is transparent, a pattern that is a composite of a surface pattern with a metallic tone of the metal thin layer 3 laid under the resin layer 6 and a pattern of the surface 6a of the resin layer 6 and gives an impression of depth and solidity can be seen at the surface of the thin film-like material B as a whole. For example, if the surface 3a of the metal thin layer is a mirror surface and the surface 6a of the resin layer has a hologram pattern a lustrous hologram pattern having a metallic tone and giving an impression of depth and solidity can be seen at the surface of the thin film-like material B.

Figure 10:
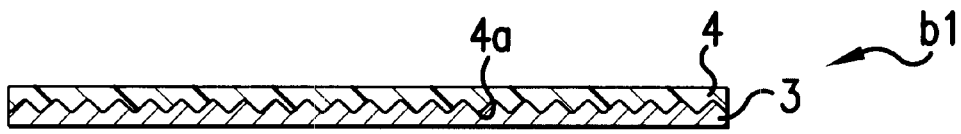
FIG. 10 s a cross-sectional view showing layer structure of a laminated sheet $b_1$ used in producing the thin film-like material B.

The thin film-like material B can be produced as follows:

First, as shown in FIG. 10, a laminated sheet $b_1$ is produced by forming a metal thin layer 3 of a desired thickness on a surface 4a of a first transfer resin film 4, for example, by vacuum deposition process. The first transfer resin film 4 used here may be made of the same substance as the resin film used in producing the thin film-like material A is made of. The surface 4a has a non-smooth respect pattern that is in a negative-to-positive or positive-to-negative relationship with respect to a to-be-produced surface pattern of the metal thin layer.

Figure 11:
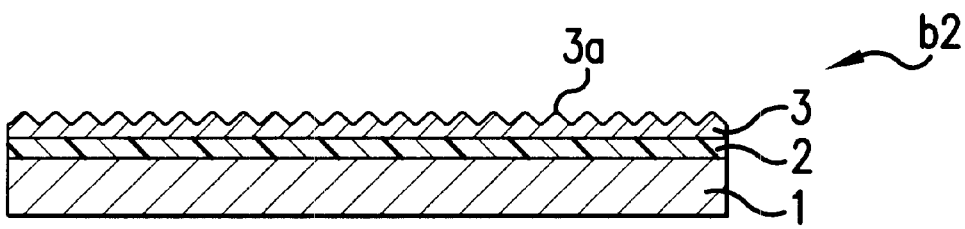
FIG. 11 is a cross-sectional view showing layer structure of a laminated sheet $b_2$.

Next, adhesive is applied on the surface of the metal thin layer 3 of the laminated sheet $b_1$ to form a determined thickness. Then, a base material 1 is pressed on it, and the adhesive is cured, for example, by heating. Then, the first resin film is removed. As a result, as shown in FIG. 11, a laminated sheet $b_2$ is obtained wherein the base material 1 and the metal thin layer 3 are stuck together with an adhesive layer 3 between, and the surface 3a of the metal thin layer has a pattern transferred from the surface 4a of the first resin film 1. In this transferring process, the adhesive may be applied on a surface of the base material instead of the surface of the metal thin layer 3.

Figure 12:
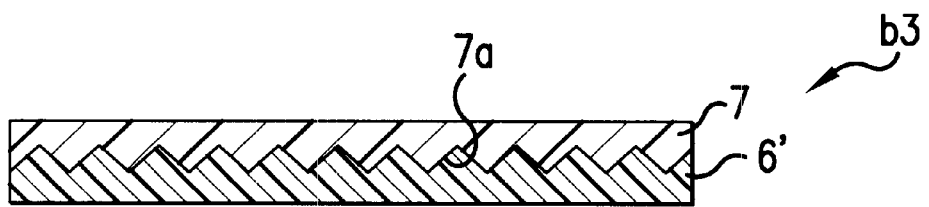
FIG. 12 is a cross-sectional view showing layer structure of a laminated sheet $b_3$.

On the other hand, as shown in FIG. 12, a second resin film 7 whose surface 7a has a non-smooth pattern that is in a negative-to-positive or positive-to-negative relationship with respect to a to-be-produced surface pattern of the thin film-like material B is prepared. By applying uncured and viscous resin 6', which is to be formed into a resin layer 6, to form a desired thickness, a laminated sheet $b_3$ is produced.

Figure 13:
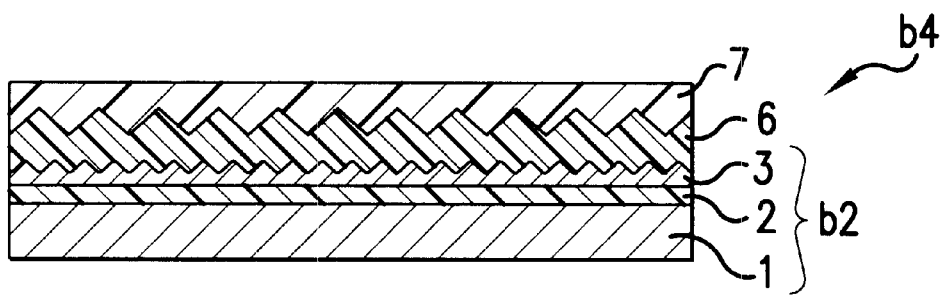
FIG. 13 is a cross-sectional view showing layer structure of a laminated sheet $b_4$ produced by integrating the laminated sheets $b_2$ and $b_3$.

Then, as show in FIG. 13, while the resin 6' is uncured, the laminated sheet $b_3$ is laid on the laminated sheet $b_2$ with the resin 6' side being placed on the surface 3a of the metal thin layer, and the whole is subjected to thermal contact bonding so that a laminated sheet $b_4$ may be produced. In that process, the resin 6' of the laminated sheet $b_3$ sticks to the metal thin layer 3, and it is cured to form a resin layer 6.

Last, the second resin film 7 of the laminated sheet $b_4$ is removed. As a result, thin film like material B of FIG. 9 having a laminated structure β is obtained wherein the resin layer 6 has a surface 6a that has a pattern transferred from the surface of the second resin film and the opposite surface 6b that has a pattern corresponding to the pattern of the surface 3a of the metal thin layer 3.

If resin indicating a high volume shrinkage in curing is used as the resin 6', it is desirable to apply soft resin capable of absorbing volume shrinkage such as polyester resin, polyether resin or polyurethane resin the entire surface of the metal thin layer 3 of the laminated sheet $b_2$, for example, by gravure printing, because it improves the adhesion between the formed resin layer 6 and the metal thin layer 3.

Figure 14:
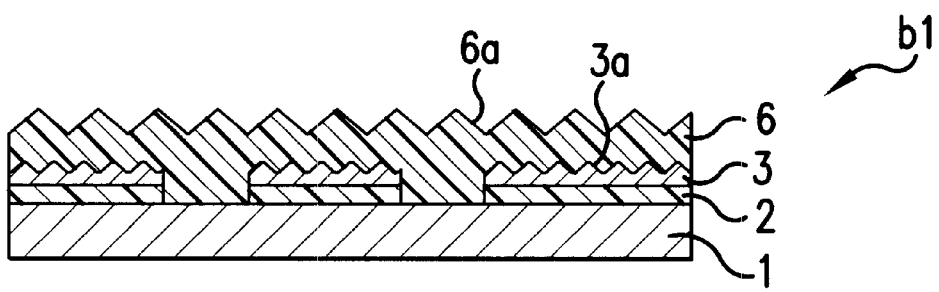
FIG. 14 is a cross-sectional view showing layer structure of another thin film-like material $B_1$.

FIG. 14 shows layer structure of another thin film-like material $B_1$ that belongs in a group of the thin film-like material B. In the thin layer material $B_1$, a metal thin layer 3 of thin film-like material B is formed an a base material 1 as a desired two-dimensional pattern, and buried in a resin layer 6. Specifically, in the layer structure of the thin film-like material $B_1$, the metal thin layer under the resin layer 6 does not exist as one continuous thin layer instead, the metal thin layer and adhesive layer include non-existing portions with respect to a two-dimensional pattern formed, and those non-existing portions are also buried in the resin layer 6.

In the thin layer material $B_1$, at the surface 6a of the resin layer 6, a surface pattern of the resin layer can be seen with an impression of depth and solidity and with a tone of the metal thin layer 3 placed under. In addition, there are also parts that have only a surface pattern of the resin layer. Therefore, the thin film-like material $B_1$ as a whole has a design whose effect is completely different from that of the thin film-like material B.

Figure 15:
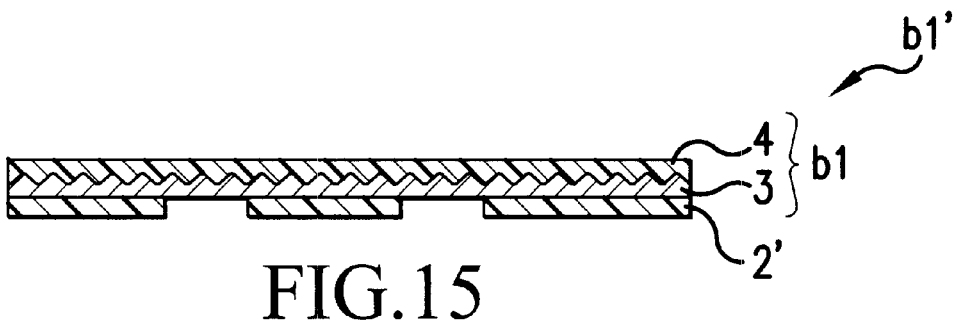
FIG. 15 is a cross-sectional view showing layer structure of a laminated sheet $b_1'$ used in producing the thin film-like material B.

The thin film-like material $B_1$ is produced as follows:

First, as shown in FIG. 15, a laminated sheet $b_1'$ is produced by applying adhesive 2' on the surface of a metal thin layer 3 of a laminated sheet $b_1$ shown in FIG. 10, after a to-be-produced two-dimensional pattern. Then the laminated sheet $b_1'$ and a base material is stuck together with the adhesive 2' side being placed on the base material, and the adhesive 2' is cured. Then a resin film 4 is removed.

Figure 16:
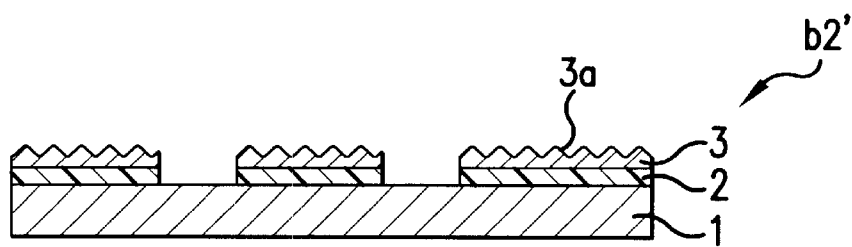
FIG. 16 is a cross-sectional view showing layer structure of a laminated sheet $b_2'$

The parts of the metal thin layer 3 which stick to the adhesive 2' are left as they are, while the other parts of the metal thin layer 3 are removed together with the film 4. As a result, as shown in FIG. 16, a laminated sheet $b_2'$ is produced wherein the metal thin layer 3 having the same two-dimensional pattern as the adhesive 2' was applied is transferred onto parts of the surface of the base material 1.

Then, a laminated sheet $b_3$ shown in FIG. 12 is laid on the laminated sheet $b_3$. After resin 6' is cured, a resin film 7 is removed. Thus, thin film-like material $B_1$ shown in FIG. 14 is obtained.

Figure 17:
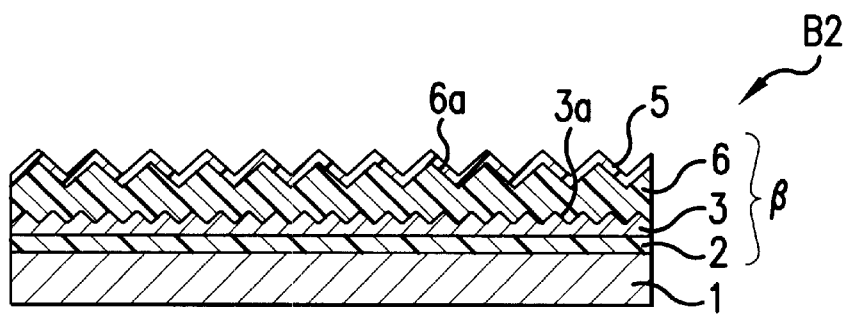
FIG. 17 is a cross-sectional view showing layer structure of another thin film-like material $B_2$.

As in the case of the thin film-like material A, it is desirable to form a resin coating film 5 for imparting printability on the non-smooth surface 6a of the resin layer 6 of the thin film-like material B ($B_1$) to thereby produce thin film-like material $B_2$ shown in FIG. 17. Since a desired printed pattern can be added to the original pattern of the thin film-like material B ($B_1$), the thin film-like material $B_2$ can have a design having a more unique effect.

In forming the resin coating film 5, resin coating material needs to be applied to form a thickness not so large that the non-smooth pattern of the surface 6a of the resin layer 6 may be buried in the formed resin coating film 5. If the resin coating material is applied so thick that the non-smooth pattern is buried in the formed resin coating film 5, the thin film-like material cannot have the unique effect that is based on the surface pattern of the resin layer 6.

The resin coating film 5 may have a one-layer structure as shown in FIG. 17. It may also have a two-layer structure as in the case of the thin film-like material A.

Further, as in the case of the thin film-like material A, the laminated structure β may be formed on each of the opposite sides of the base material 1. Further, the laminated structure β may be formed on one side of the base material while a protective sheet is stuck on the opposite side of the base material The thin film-like material B (B1, B2) can have designs having unique effects as described below.

First, if marks are printed for example, with transparent ink on the surface 6a of the resin layer 6 having a non-smooth pattern in a manner that the surface 6a having a non-smooth pattern is buried under the printed marks, the pattern of the upper layers of the thin film-like material, that was seen before printing disappears at the portions where marks are printed. Instead, only a color tone of the metal thin layer laid under the resin layer 6 is seen with an impression of transparency. The same effect is obtained by applying transparent tape or drawing marks with magic ink of various colors instead of printing marks with transparent ink.

At the portions where marks are not printed, the non-smooth pattern is seen as it was before printing. Thus, the thin film-like material B can be very, easily provided with a design having a unique effect, that is, a design consisting of mixture of parts having a desired pattern and parts having a metallic color tone.

In the thin film-like material B, if letters or marks consisting of very narrow lines are printed on the non-smooth surface of the resin layer 6, for example, with transparent ink, in a manner that the non-smooth surface 6a is buried under the printed lines, those letters or marks are difficult to recognize by the naked eye. However, this thin film-like material B has the following unique effect: If a copy of the surface having those printed letters or marks is made, for example, by a xerographic machine, the letters or marks clearly appear in the obtained copy.

Further, in the thin film-like material $B_1$, if the metal thin layer 3 is formed after an appropriate two-dimensional pattern with the pitch between the non-existing portions of the metal thin layer 3 being determined appropriately, the thin film-like material $B_1$ has a design having the following unique effect: Depending on the angle between the surface having the non-smooth pattern and the line of sight, the non-smooth pattern is clearly seen or disappears.

Figure 18:
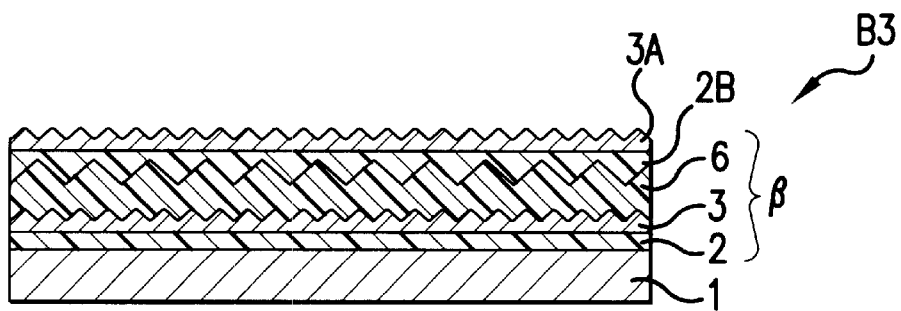
FIG. 18 is a cross-sectional view showing layer structure of another thin film-like material $B_3$.

FIG. 18 shows layer structure of another thin film-like material $B_3$ that belongs in the group of the thin film-like material B in the thin film-like material $B_3$, an Al thin layer 3A of 3 to 10 nm in thickness is laid on the uppermost layer, that is, a resin layer 6 of a laminated structure β of thin film-like material B shown in FIG. 9a, with a transparent or translucent adhesive layer 2B between. In the thin film-like material $B_3$, at least the surface of the Al thin layer 3A is a smooth mirror surface (smooth surface having a mirror pattern), a surface having a mat pattern, a surface having a hairline pattern, a surface having an embossed pattern, a surface having a hologram pattern or a surface having more than one of those patterns combined appropriately.

Since the thickness of the Al thin layer 3A is very small as mentioned above, the Al thin layer 3A is translucent. Since the adhesive layer 2B that lies under the Al thin layer 3A is also transparent or translucent, a unique visual effect is produced from a combination of the effect of the design of the thin film-like material B, which is barely seen at the surface of the thin film-like material $B_3$, and the effect of the design of the surface of the Al thin layer, which is clearly seen.

The thin film-like material $B_3$ can be produced as follows: A laminated sheet $a_1$ shown in FIG. 2 including an Al thin layer of 3 to 10 nm in thickness is prepared. Then, the laminated sheet $a_1$ is laid on the surface of thin film-like material B shown in FIG. 9 with transparent or translucent adhesive between. Then a transfer resin film is removed.

Next, thin film-like material C and process of producing it will be described.

Figure 19:
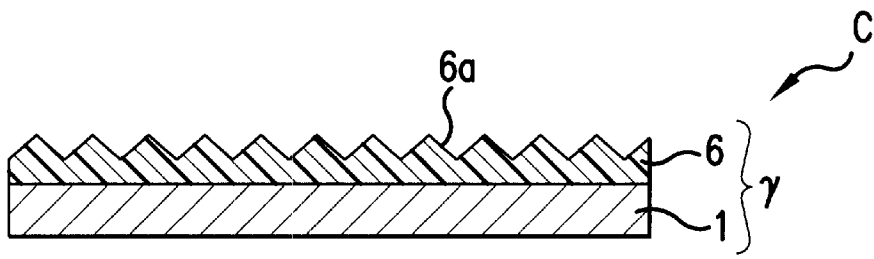
FIG. 19 is a cross-sectional view showing layer structure of thin film-like material C of the present invention.

FIG. 19 shows basic layer structure of the thin film-like material C. Unlike the thin film-like materials A and B, the thin film-like material C does not-include a metal thin layer. The thin film-like material C has a laminated structure γ wherein a resin layer 6 is laid directly on a base material 1. A surface 6a of the resin layer 6 is a non-smooth surface having a mat pattern, a non-smooth surface having an embossed pattern, a non-smooth surface having a hairline pattern, a non-smooth surface having a hologram pattern or a non-smooth surface having more than one of those patterns combined appropriately.

Here, the base material 1 and the resin layer 6 may be made of the same substances as those of the thin film-like material B.

The thin film-like material C can be produced as follows; A laminated sheet $b_3$ as shown in FIG. 12 is produced by applying uncured and viscous resin, which is to be formed into a resin layer 6, to form a desired thickness on a surface of a resin film having a desired non-smooth pattern. Then the laminated sheet $b_3$ is laid on a base material 1 with the surface of the resin-applied side being planed on the base material, and the resin is cured. Last, the resin film is removed. The resin is cured in a state that the base material 1 is stuck on it. As a result, the resin turns into a resin layer 6 and it is transferred to the base material side. The non-smooth pattern of the resin film is transferred to the surface of the resin layer 6, wherein the transferred pattern is in a negative-to-positive or positive-to-negative relationship with respect to the original pattern.

As in the case of the thin film-like material B, it is desirable to form a resin coating film for imparting printability on the surface 6a of the resin layer 6 having a non-smooth pattern, in a manner that the resin coating film does not have such a thickness that the non-smooth pattern is buried in the resin coating film 5. The resin layer 6 may be transparent or translucent. The resin layer 6 may be colored by blending resin with pigment or the like.

In the thin film-like material C, if the resin layer 6 is transparent or translucent, unique phenomenon such that if a hand touches the surface 6a, the pattern at the touched portion disappears due to grease or water happens easily. However, if the resin layer 6 is colored, such phenomenon does not happen easily.

Further, if a resin coating film for imparting printability is formed on the surface of the thin film-like material C and then a pattern is printed on it, an impression such that the printed patter is moving can be produced.

Also in the case of the thin film-like material C, an Al thin layer of 3 to 10 nm in thickness may be formed on the laminated structure γ with a transparent or translucent adhesive layer between, as in the case of the thin film-like material $B_3$ (FIG. 18).

Next, thin film-like material D and process of producing it will be described.

Figure 20:
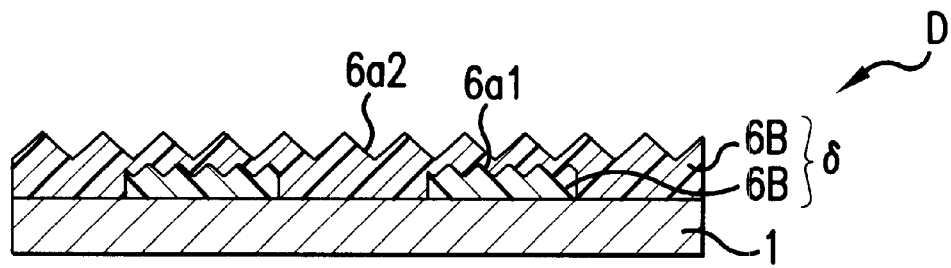
FIG. 20 is a cross-sectional view showing layer structure of thin film-like material D of the present invention.

FIG. 20 shows basic layer structure of the thin film-like material D. The thin film-like material D has a laminated structure δ wherein two resin layers 6A and 6B are laid on a base material 1. The lower resin layer 6A is made of colored resin, and the upper resin layer 6B is made of transparent or translucent resin.

The lower resin layer 6A is formed on the base material 1 as a desired two-dimensional pattern, and buried in the upper resin layer 6B. Therefore, from the surface of the upper resin layer 6B, the lower resin layer 6B that is formed as a desired pattern and itself creates a colored pattern can be seen.

The surface $6a_1$ of the lower resin layer 6A is a smooth mirror surface (smooth surface having a mirror pattern), a surface having a mat pattern, a surface having a hairline pattern, a surface having an embossed pattern, a surface having a hologram pattern or a surface having more than one of those patterns combined appropriately. The surface $6a_2$ of the upper resin layer 6B is a surface having a mat pattern, a surface having a hairline pattern, a surface having an embossed pattern, a surface having a hologram pattern or a surface having more than one of those patterns combined appropriately.

Figure 21:
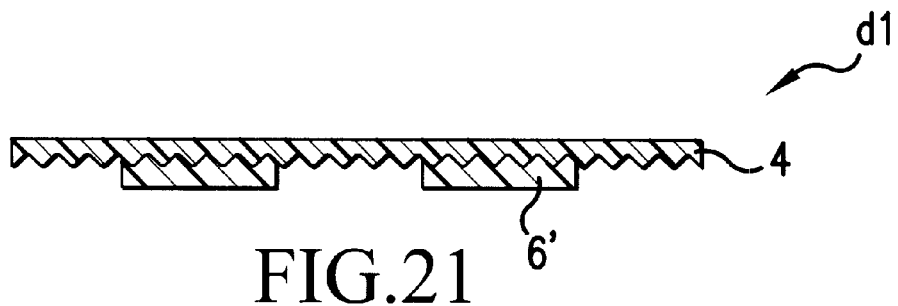
FIG. 21 is a cross-sectional view showing layer structure of a laminated sheet $d_1$ used in producing the thin film-like material D.

The thin film-like material D can be produced as follows: First, a first transfer resin film 4 having a surface pattern that is in a negative-to-positive or positive-to-negative relationship with respect to a to-be-produced surface pattern of a lower resin layer 6A. Then uncured colored resin 6' is applied on that surface of the first transfer resin film 4 according to the same two-dimensional pattern as a lower resin layer is to be formed on the base material. Thus, a laminated sheet $d_1$ is produced (FIG. 21).

Then, the laminated sheet $d_1$ is laid on a base material 1 with the surface of the colored resin 6' side being placed on the base material 1. Then the colored resin 6' is cured and formed into a resin layer stuck on the base material 1. Then the first transfer resin film is removed.

Figure 22:
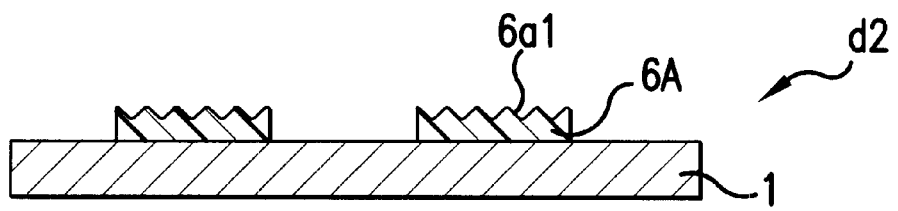
FIG. 22 is a cross-sectional view showing layer structure of a laminated sheet $d_2$.

As a result, as shown in FIG. 22, a base sheet $d_2$ having a resin layer 6A transferred to the base material 1 is obtained. Here, the resin layer 6A has a surface pattern $6a_1$ that is in a negative-to-positive or positive-to-negative relationship with respect to the surface pattern of the resin film 4, and the resin layer 6A itself having a desired two-dimensional pattern is formed.

Figure 23:
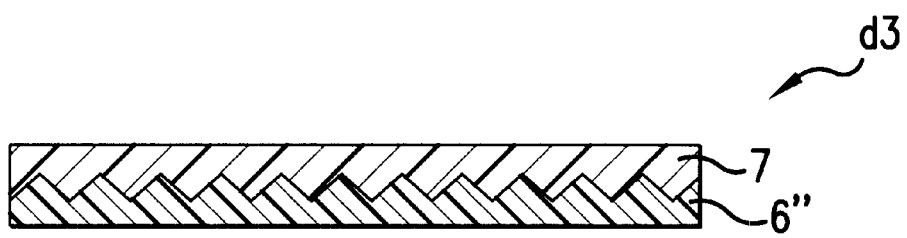
FIG. 23 is a cross-sectional view showing layer structure of a laminated sheet $d_3$.

On the other hand, a second transfer resin film 7 having a surface pattern that is in a negative-to-positive or positive-to-negative relationship with respect to a to-be-produced surface pattern of on upper resin layer 6B is prepared. Then, uncured transparent or translucent resin 6" is applied on that surface of the transfer resin film 7. Thus, a laminated sheet $d_3$ is produced (FIG. 23).

Figure 24:
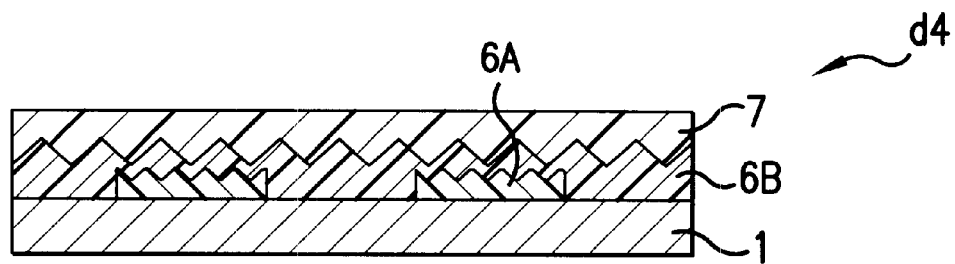
FIG. 24 is a cross-sectional view showing layer structure of a laminated sheet $d_4$ produced by integrating the laminated sheets $d_2$ and $d_3$.

Then, while the resin 6" is uncured, the laminated sheet $d_3$ is laid on the laminated sheet $d_2$ with the resin 6" side being placed on the colored resin layer 6A side as shown in FIG. 24. Then, the colored resin 6" is cured and formed into a transparent or translucent resin layer 6B. Thus, a laminated sheet $d_4$ is produced.

Last, by removing the resin film 7 from the laminated sheet $d_4$ and thereby transferring the resin layer 6B to the base material sheet side, a laminated stricture δ is produced. Thus, thin film-like material D shown in FIG. 20 is obtained.

As in the case of the above-described thin film-like materials B and C, it is desirable to form a resin coating film for imparting printability on the surface $6a_2$ of the upper resin layer 6B having a non-smooth pattern in a manner that the resin coating film does not have such a thickness that the non-smooth pattern is buried in the resin coating film. In that case, a pattern can be printed on the surface of the thin film-like material D. Further, the upper resin layer and the lower resin layer may be made from uncured resin blended with pigment or the like. Further, as in the case of the thin film-like material $B_3$, an Al thin layer of 3 to 10 nm in thickness may be formed on the laminated structure δ with a transparent or translucent adhesive layer between.

In the thin film-like material D, the lower resin layer 6A having a desired and colored two-dimensional pattern can be seen from the surface of the thin film-like material D as a whole. In addition, the surface pattern of the colored lower resin layer 6A can be seen through the surface pattern of the transparent or translucent upper resin layer 6B. Thus, the thin film-like material D as a whole has a design having a unique effect such that three kinds of patterns combined three-dimensionally are seen.

For example, if the lower resin layer 6A is colored black by blending the resin with carbon black and the pitch between the marks that the lower resin layer formed is determined appropriately, the thin film-like material D produces an impression such that the three-dimensional black marks are swinging, when the surface of the thin film-like material D as a whole is viewed at a certain angle.

Next, thin film-like material E and process of producing it will be described.

Figure 25:
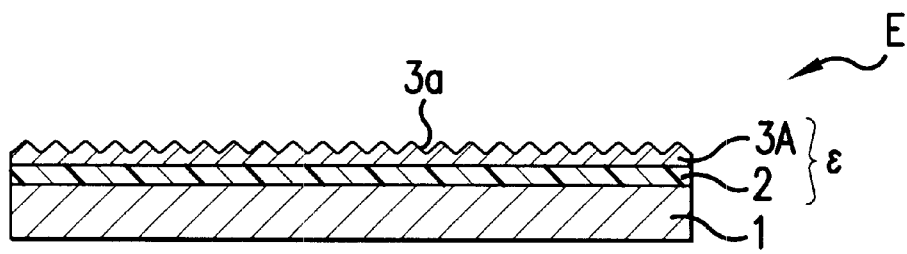
FIG. 25 is a cross-sectional view showing layer structure of translucent thin film-like material E of the present invention.

FIG. 25 shows basic layer structure of the thin film-like material E. The thin film-like material E has a laminated structure ε that is the same in layer structure as the thin film-like material A shown in FIG. 1. However, in the thin film-like material E, the following is the essential requisites: A base material 1 is made of a transparent or translucent substance; an adhesive layer 2 is also made of transparent of translucent resin; and a metal thin layer 3A is an Al thin layer of 3 to 10 nm in thickness such as an Al deposited layer.

With the above structure, the thin film-like material E is translucent as viewed in the direction of thickness.

Here, the surface 3a of the Al thin layer 3A may be a smooth mirror surface (smooth surface having a mirror pattern), a non-smooth surface having a mat pattern, a non-smooth surface having a hairline pattern, a non-smooth surface having an embossed pattern, a non-smooth surface having a hologram pattern or a non-smooth surface having more than one of those patterns combined appropriately. In that case the rear side of the laminated structure ε can be seen through, in the translucent state.

As in the case of the thin film-like material $A_2$, if a resin coating film 5 for imparting printablity is formed on the surface of the metal thin layer 3A and a pattern is printed on it with transparent ink, the thin film-like material E has a design having another effect. Here, if back-light is applied to the thin film-like material E, the design has an effect such that the printed pattern emerges so that it can be seen.

The thin film-like material E can be produced in the same manner as the thin film-like material A, except that in producing a laminated sheet $a_1$, an Al thin layer is formed to have a thickness of 3 to 10 nm, and that adhesive and base material each made of a transparent or translucent substance are used.

Figure 26:
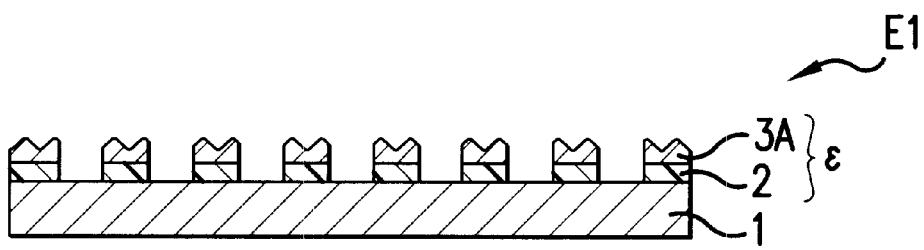
FIG. 26 is a cross-sectional view showing layer structure of another translucent thin film-like material $E_1$.

Also the translucent than film-like material E may be formed as thin film-like material $E_1$ in which an Al thin layer 3A is formed on parts of a surface of a base material 1 as shown in FIG. 26.

Figure 27:
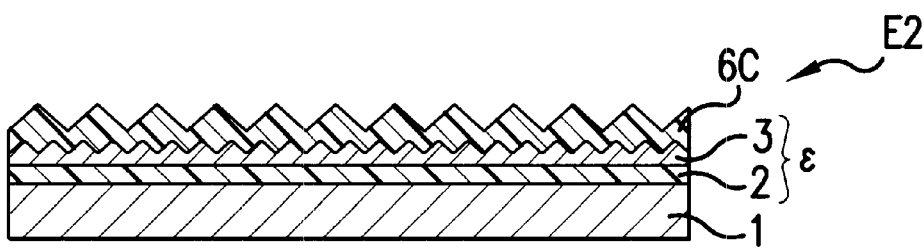
FIG. 27 is a cross-sectional view showing layer structure of another translucent thin film-like material $E_2$.

FIG. 27 shows layer structure of another thin film-like material $E_2$ that belongs in a group of the thin film-like material E. In the thin film-like material $E_2$, a transparent or translucent resin layer 6C is formed on the uppermost layer, that is, an Al thin layer 3A of a laminated structure ε of thin film-like material E. The surface of the resin layer 6C is a smooth mirror surface (smooth surface having a mirror pattern), a surface having a mat pattern, a surface having a hairline pattern, a surface having an embossed pattern, a surface having a hologram pattern or a surface having more than one of those patterns combined appropriately.

In the thin film-like material $E_2$, an impression such that a design is changing by mutual interference of the surface of the lower layer and the surface of the upper layer is produced, and the rear side of the thin film-like material $E_2$ is seen through the laminated structure. Thus, the thin film-like material has a design having an effect different from that of the thin film-like material E.

The thin film-like material $E_2$ can be produced as follows: A laminated sheet $b_3$ shown in FIG. 12 that is produced using transparent or translucent adhesive is laid on a laminated structure ε of thin film-like material E shown in FIG. 25. Then the adhesive is cured, and a transfer resin film is removed.

As in the case of the thin film-like material $B_3$, an Al thin layer of 3 to 10 nm in thickness may be formed on the laminated structure ε with a translucent adhesive layer between.

Next, thin film-like material F and process of producing it will be described.

In the thin film-like material F, a metal thin layer is formed on parts of the surface of a luminated structure α, β, γ or δ, that is, parts of the uppermost surface of thin film-like material A, B, C or D as described above, with an adhesive between.

Figure 28:
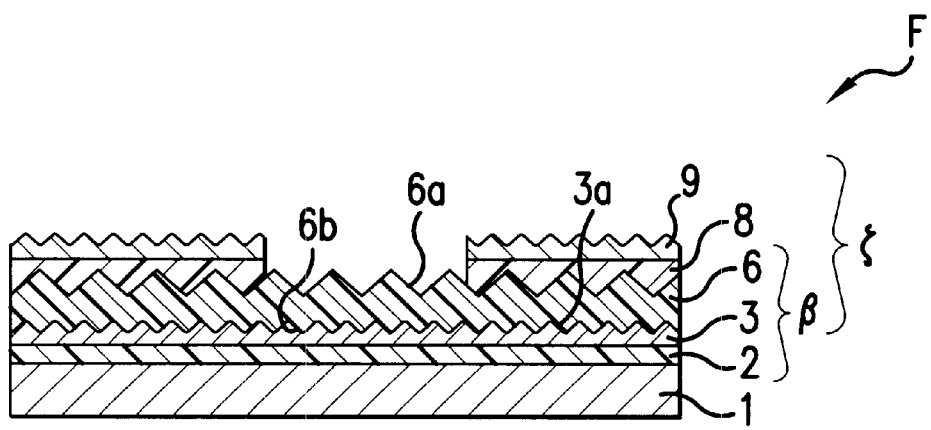
FIG. 28 is a cross-sectional view showing layer structure of thin film-like material F of the present invention.

For example, in thin film-like material F shown in FIG. 28, a metal thin layer 9 is formed on parts of the surface of thin film-like material B shown in FIG. 9, with respect to a desired two-dimensional pattern, with an adhesive layer 8 between. Thus, a laminated structure ζ consisting of an adhesive layer 2, a metal thin layer 3, a resin layer 6, an adhesive layer 8 and the metal thin layer 9 is formed on a base material 1.

Thus, in the thin film-like material F, in addition to a pattern which the metal thin layer 9 formed as the two-dimensional pattern itself creates, a surface pattern 6a of the resin layer 6 and a surface pattern of the metal thin layer 9 can be seen in a mixed state.

The thin film-like material F can be produced as follows:

First, for example, thin film-like material B is produced in the above-described manner. On the other hand, a metal thin layer is formed on the surface of a transfer resin web and sheet which has a desired pattern, to thereby produce a laminated sheet $f_1$ that has the same structure as the laminated sheet $a_1$ shown in FIG. 2.

Figure 29:
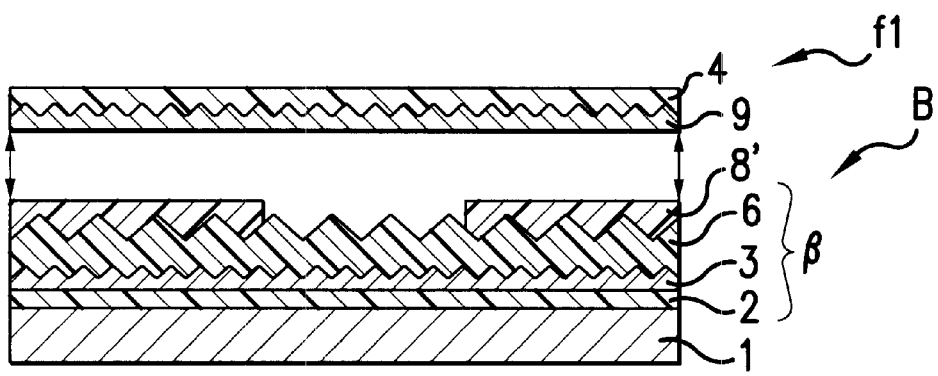
FIG. 29 is a cross-sectional view showing how a laminated sheet $f_1$ is laid on thin film-like material B in the process of producing the thin film-like material F.

Then, as shown in FIG. 29, adhesive 8' is applied on the surface of the thin film-like material B according to a desired two-dimensional pattern, and then the laminated sheet $f_1$ is stuck on it with the surface of the metal thin layer 9 side being placed on the adhesive 8' side. Then the adhesive 8' is cured and formed into an adhesive layer, and then a transfer resin film 4 is removed.

As a result, the portions of the metal thin layer 9 which stick to the adhesive 8' are left on the thin film-like material B, while the portions of the metal thin layer 9 which do not stick to the adhesive 8' are removed together with the resin film 4. Thus, thin film-like material F wherein a laminated structure ζ shown in FIG. 28 is formed on a base material 1 is obtained.

It is to be noted that the transfer resin film used in producing the above-described thin film-like materials is not a film that is no more usable after it is once used. It can be used a plurality of times. However, when the film is reused many times, the film is extended, and a pattern transferred from the film deteriorates in visual appearance. How many times the film can be used depends on a to-be-produced pattern, but generally the film can be used about twice to 10 times.

EXAMPLE 1

Thin film-like material A having a mirror surface was produced as follows:

First, an Al thin layer of 25 to 30 nm in thickness was formed by vacuum deposition process on one side of a biaxially oriented polypropylene film that was not treated with corona discharge and having smooth surfaces.

Then, two-part curing type polyurethane resin adhesive was applied by a gravure coater on the entire surface of the Al thin layer to form a thickness of 4 to 6 μm, and solvent was made to remove by a dryer. A coated paper web and sheet was laid on it, and both were stuck together by making them pass between warmed nipping rollers (at a temperature of 40° C.).

The coated paper web and sheet and film stuck together was left in the atmosphere at a temperature of 40° C. for about 24 hours to cure the resin adhesive. Then, the Al thin layer was transferred to the coated paper web and sheet by removing the biaxially oriented polypropylene film. Thus, thin film-like material A shown in FIG. 1 was obtained. The thin film-like material A had a silvery mirror surface having very high glossiness.

For comparison, ordinary Al deposited paper was produced as follows: Resin was applied by a gravure coater on the same coated paper web and sheet as used above to form a thickness of 2 to 3 μm, and solvent was made to remove by a dryer. Then, Al was directly vacuum-deposited on it to form an Al deposited layer of 40 to 50 nm in thickness.

The glossiness of a surface and the moisture permeability in the direction of thickness of both materials were measured in accordance with method 5 of JIS-Z-8741 and a method stipulated in JIS-Z-0208.

The glossiness and moisture permeability of the thin film-like material A were 1600 to 1650% and 150 to 190 g/m$^2$·24 hr, respectively, while those of the Al deposited paper as a comparative example were 650 to 800% and 120 to 200 g/m$^2$·24 hr, respectively.

After the mirror surface of the above thin film-like material A was treated with corona discharge, coating material was applied on it to form a coating film. Here, the coating material was prepared by blending resin coating material for imparting printability consisting of urethane resin and nitrocellulose with 5 weight % of silicic anhydride particles of 0.1 to 5 μm in particle size. The portions where the coating film was formed had a mat tone, while the portions where the coating film was not formed remained the mirror surface. Thus, a surface pattern consisting of mixture of mirror-surface portions and portions having a mat tone was formed.

When cellophane tape was stuck to the portions having a mat tone, those portions turned back to the mirror surface.

EXAMPLE 2

Thin film-like material A shown in FIG. 1 was produced with the same conditions as in example 1.

The surface of the Al thin layer 3 of the thin film-like material A was treated with corona discharge. Then, transparent resin coating material (1) for imparting printability consisting of urethane resin and nitrocellulose was applied on it by a gravure coater. In that manner, three kinds of thin film-like material $A_2$ as shown in FIG. 6 having a resin coating film 5 of 0.05 μm, 0.2 μm and 1 μm in thickness, respectively, were produced.

The adhesive power exerted between the coating film and the Al thin layer of those three materials were approximately the same. The smaller the thickness of the coating film 5 was, the higher the metallic glossiness of the surface was.

On the other hand, coating material (2) was prepared by blending the above-mentioned transparent resin coating material (1) with 5 weight % of yellow pigment and 5 weight % of silicic anhydride particles of 0.1 to 5 μm in particle size.

Then, the coating material (2) was applied on the thin film-like material $A_2$ instead of the above-mentioned resin coating film 5. As a result, the thin film-like material $A_2$ had a yellow mat coat surface with faint metallic glossiness.

Then, red coating material, blue coating material, yellow coating material and transparent varnish were applied on the surface of coating film by a UV offset printing machine in a manner that those coating materials did not overlap each other. As a result, at the portions where the transparent varnish was applied, the mat effect disappeared, and mirror-like yellow metallic glossiness was seen. At the portions where the other colored coating materials were applied, metallic glossiness of corresponding colors was seen.

EXAMPLE 3

Thin film-like material $A_2$ was produced in the same manner as in example 2, except that au biaxially oriented polypropylene film that was not treated with corona discharge and having a hologram pattern on one side was used. Then, the resin coating material (2) as used in example 2 was applied instead of the transparent resin material (1) to form a resin coating film.

At the surface of the obtained thin film-like material, a hologram pattern with yellow metallic glossiness was barely seen, but the surface as a whole gave a mat impression.

Then, red coating material, blue coating material, yellow coating material and transparent varnish were applied on that surface having the mat pattern by a UV offset printing machine in a manner that those coating materials did not overlap each other. As a result, at the portions where the transparent varnish was applied, the mat impression disappeared and the hologram pattern with yellow metallic glossiness was clearly seen. At the portions where the other colored coating materials were applied, the hologram pattern with metallic glossiness of corresponding colors was seen.

EXAMPLE 4

On one side of a biaxially oriented polypropylene film that was not treated with corona discharge and having smooth surfaces, first a hairline pattern was produced by scratching the surface by brush roll process. Then, a hologram pattern was produced on it by pressure heating process. Thus, a transfer resin film (1) was produced.

On the other hand, on one side of the same biaxially oriented polypropylene film as the above, first a hologram pattern was produced by pressure heating process, and then a hairline pattern was produced by brush roll process. Thus, a transfer resin film (2) was produced.

Further, on one side of a biaxially oriented polypropylene film that was not treated with corona discharge, portions having a hologram pattern 4A, portions having a different hologram pattern 4B and portions having a smooth surface 4C, each potion being in a square shape of about 18 mm×18 mm, were formed alternately by pressure heating process. Thus, a transfer resin film (3) was produced.

Using those three kinds of transfer resin films (1), (2), (3) each, thin film-like material A was produced in the same way as in example 2.

Next, the transparent resin coating material (1) as used in example 2 was applied on the surface of the thin film-like material A by a gravure coater to form a thickness of 0.4 μm to thereby form a resin coating film for imparting printability.

At the surface of the thin film-like material produced by using the film (1), a hairline pattern with metallic glossiness was faintly seen in a hologram pattern with metallic glossiness. At the surface of the thin film-like material produced by using the film (2), a hologram pattern with metallic glossiness was faintly seen in a hairline pattern with metallic glossiness. At the surface of the thin film-like material produced by using the film (3), mixture of portions having a hologram pattern 4A, portions having a hologram pattern 4B and portions having a mirror surface 4C, each portion being in a square shape, was seen.

EXAMPLE 5

Thin film-like material A was produced in the same manner as in example 2, except that a thin wood free paper web and sheet was used in place of a coated paper web and sheet.

When the surface of the thin film-like material was observed by the naked eye from the Al thin layer side with a light source being placed on the wood free paper web and sheet side, brightness of the light source was faintly recognized.

Three kinds of resin adhesive were prepared by blending the resin adhesive used in producing the thin film-like material with 5 weight %, 8 weight % and 1.5 weight % of carbon black of about 0.3 μm in particle size, respectively. Using those three kinds of resin adhesive each, thin film-like material A was produced.

Then, the Al thin layer of each thin film-like material was treated with corona discharge and the transparent resin coating material (1) as used in example (2) was applied on it to form a thickness of 0.2 μm.

In the case of the thin film-like material using the resin adhesive blended with 8 weight % or more of carbon black, brightness of the light source placed on the rear side was not recognized from the front side.

Then a pattern was printed on the surface of each thin film-like material by a UV offset printing machine. Each thin film-like material was stuck on a window and its printed surface was observed. In any of the materials, the printed pattern was not difficult to see due to sunlight.

EXAMPLE 6

Thin film-like material B as shown in FIG. 9 was produced as follows:

On one side of a biaxially oriented polypropylene film that was not treated with corona discharge and having smooth surfaces, an Al thin layer of 25 to 30 nm in thickness was formed by vacuum deposition process to thereby produce a laminated sheet $b_1$ as shown in FIG. 10.

Next, two-part curing type transparent polyurethane resin adhesive was applied by a gravure coater on the entire surface of the Al thin layer 3 to form a thickness of 4 to 6 μm, and solvent was made to remove by a dryer. A coated paper web and sheet was laid on it, and both were stuck together by making them pass between warmed nipping rollers (at a temperature of 40° C.). The coated paper web and sheet and film stuck together was left in the atmosphere at a temperature of 40° C. for about 24 hours to cure the resin adhesive. Then, the Al thin layer was transferred to the coated paper web and sheet by removing the biaxially oriented polypropylene film. Thus, a laminated sheet $b_2$ as shown in FIG. 11 was obtained.

On the other hand, films (4), (5), (6), (7) were prepared by forming, on one side of biaxially oriented polypropylene films that were not treated with corona discharge and having smooth surfaces, a hologram pattern by pressure heating process, a hairline pattern by brush roll process, an embossed pattern by pressure heating process, and a mat pattern by imparting minute roughness during the film being formed, respectively. Also a film (3) as used in example 4 was prepared.

Then, two-part curing type transparent polyurethane resin adhesive was applied on each film by a gravure coater to form a thickness of 1 to 3 μm to thereby produce a laminated sheet $b_3$ as shown in FIG. 12.

Then, the laminated sheet $b_3$ was laid on the laminated sheet $b_2$ with the adhesive 6' side being placed on the surface of the Al thin layer 3, and both were stuck together by making them pass between warmed nipping rollers (at a temperature of 40° C). Then the laminated sheets $b_3$ and $b_2$ struck together was left in the atmosphere at a temperature of 40° C. for about 24 hours to cure the resin adhesive. Then the film was removed.

The surface of the obtained thin film-like material had a design having a unique effect consisting of metallic glossiness of the mirror surface of the lower Al thin layer and the surface pattern of the upper resin layer overlapping each other with a delicate impression.

Specifically, the thin film-like material produced by using the film (4) had a hologram pattern with metallic glossiness. The thin film-like material produced by using the film (5) had a hairline pattern with metallic glossiness. The thin film-like material produced by using the film (6) had an embossed pattern with metallic glossiness. The thin film-like material produced using by the film (7) had a mat pattern with metallic glossiness. The thin film-like material produced by using the film (3) had a pattern consisting of mixture of two kinds of hologram-patterned portions with metallic glossiness and mirror-surface portions with metallic glossiness.

Next, the transparent resin coating material (1) as used in example 2 was applied on the surface of each thin film-like material by a gravure coater to form a thickness of 0.1 μm to thereby form a resin coating film for imparting printability. Then, red coating material, yellow coating material, blue coating material and transparent varnish were applied on it by a UV offset printing machine in a manner that those coating materials did not overlap each other.

At the portions where the transparent varnish was applied, the unique surface pattern of which thin film-like material disappeared, and the mirror surface with metallic glossiness was seen. At the portions where the other colored coating materials were applied, the surface pattern of each thin film-like material disappeared, and metallic glossiness of corresponding colors was seen.

EXAMPLE 7

Among the thin film-like materials produced in example 6, the thin film-like material produced by using the film (4) having a hologram pattern was taken and the transparent resin coating material (1) as used in example 7 was applied by a gravure coater on the entire surface of that thin film-like material to form a thickness of 0.1 μm to thereby form a resin coating film for imparting printability. Then, letters and marks consisting of very narrow lines were drawn on parts of the resin coating film with the same transparent resin coating material (1) to form a thickness of 0.4 μm. Thus, the resin coating film for imparting printability having two-layer structure in part was formed.

The letters and marks consisting of very narrow lines, which formed the upper layer of the two-layer structure, were not recognized by the eye, but when a copy of the surface having those letters and marks was made by a xerographic machine, the letters and marks clearly appeared in the obtained copy.

EXAMPLE 8

Thin film-like material was produced in the same manner as in example 6, except that in producing the laminated sheet $b_2$, adhesive was applied on the coated paper web and sheet 1 with a desired pattern so that parts of the Al thin layer were transferred from the laminated sheet $b_1$ to the coated paper web and sheet side. Thus, thin film-like material $B_1$ as shown in FIG. 14 was obtained.

At the portions of the surface of the thin film-like material $B_1$ under which the Al thin layer was formed, the surface pattern of the Al thin layer which itself was formed according to a certain pattern and the surface pattern of the resin layer were seen overlapping each other with a delicate impression. At the portions that were over the non-existing portions of the Al thin layer, the surface pattern of the resin layer was seen. Thus, the thin film-like material $B_1$ as a whole had a design having a unique effect consisting of combination of the above two effects.

EXAMPLE 9

Laminated sheets $b_3$ as shown in FIG. 12 were produced by using the five kinds of films (4), (5), (6), (7), (3) as used in example 6. Each laminated sheet was laid on a coated paper web and sheet, and resin adhesive (uncured resin) was cured in the same manner as in example 6. Then, each film was removed. Thus, thin film-like materials C as shown in FIG. 19 were produced.

Then, the transparent resin coating material (1) as used in example 2 was applied on the surface of each thin film-like material to thereby form a resin coating film for imparting printability.

Here, the thickness of the coating film was varied to be 0.05 μm, 0.1 μm and 0.2 μm. When the thickness was 0.05 μm, the surface pattern was seen most clearly.

When the surface was touched by a wet hand, the surface pattern of the resin coating film disappeared at the touched portion.

On the other hand, resin coating material (3) was prepared by blending the transparent resin coating material (1) as used in example 2 with 1 weight % of yellow pigment.

Then, the resin coating material (3) was applied on the surface of each thin film-like material C to form a resin coating film for imparting printability. The surface pattern of the resin coating film disappeared by being touched by a wet hand a little less easily than it did when the resin coating film was formed of the transparent resin coating material (1).

Further, a laminated sheet $b_3$ was produced using resin adhesive blended with carbon black and colored black. Using that laminated sheet $b_3$, thin film-like material C as shown in FIG. 19 was produced. In the case of that thin film-like material, a black three-dimensional surface pattern was seen, and the surface pattern did not disappear by being touched by a wet hand.

Further, a resin coating film for imparting printability was formed by applying the transparent resin coating material (1) or the resin coating material (3). Then, letters and marks consisting of narrow lines were drawn on the resin coating film by a cylinder with the same resin coating material as that used for forming the resin coating film.

When the base material was a double-coated paper web and sheet, the letters and marks were more difficult to see when the transparent resin coating material (1) was used than when the resin coating material (3) was used, even if the angle of the line of sight was changed.

EXAMPLE 10

Figure 30:
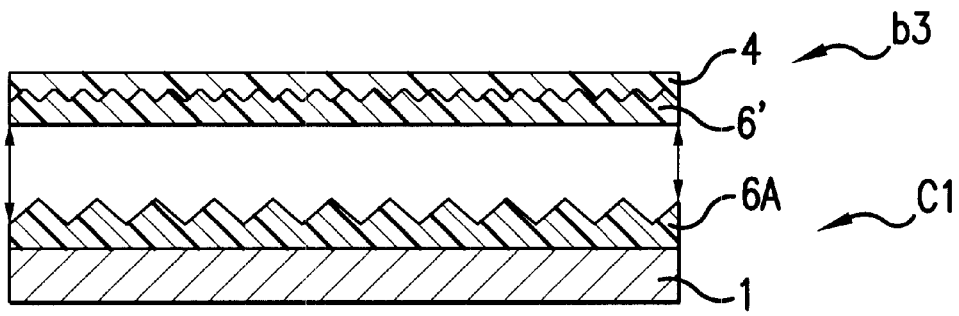
FIG. 30 is a cross-sectional view showing how a laminated sheet $b_3$ is laid on thin film-like material $C_1$.

Yellow and black resin adhesives were prepared. Each adhesive was applied on the entire surface of the film (4) as used in example 6 to produce a laminated sheet $b_3$ as shown in FIG. 12. Using the laminated sheet $b_3$, thin film-like material $C_1$ as shown in FIG. 30 wherein the base material was a coated paper web and sheet was produced.

Transparent resin adhesive 6' was applied on the entire surface of the film (5) as used in example 6. Then, the film (5) was laid on the thin film-like material $C_1$ with the surface of the adhesive side being placed on the surface of the resin layer 6A as shown in FIG. 30.

Figure 31:
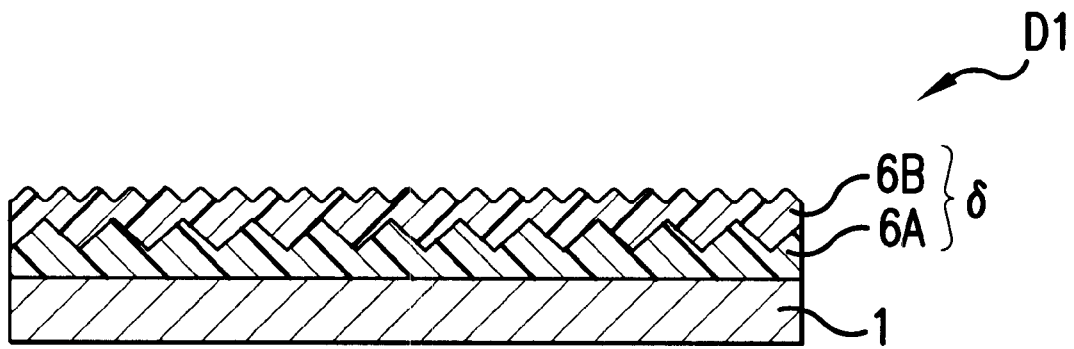
FIG. 31 is a cross-sectional view showing thin film-like material $D_1$ of the present invention.

After the transparent resin adhesive 6' was cured in the same manner as in example 6, the film (5) was removed. Thus, thin film-like material $D_1$ having a laminated structure δ as shown in FIG. 31 was produced.

The thin film-like material $D_1$ had a design consisting of the hologram pattern of the lower yellow or black resin layer 6A and the hairline pattern of the upper transparent resin layer 6B interfering with each other with a delicate impression, which produced a unique effect such that the patterns were swinging when the surface of the thin film-like material $D_1$ was viewed at a certain angle. The effect such that the patters were swinging was stronger when the lower layer was the black resin layer.

EXAMPLE 11

Figure 32:
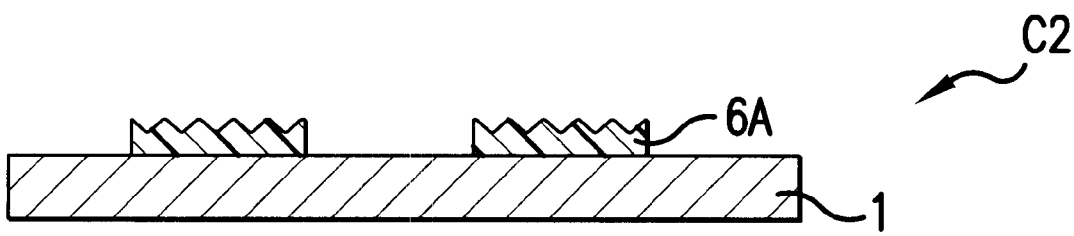
FIG. 32 is a cross-sectional view showing thin film-like material $C_2$ of the present invention.

Thin film-like material $C_2$ as shown in FIG. 32 was produced in the same manner as in example 10, except that yellow and black resin adhesives were applied not on the entire surface but on parts of the surface of the film (4). Then, the laminated sheet $b_3$ as used in FIG. 12 was laid on the thin film-like material $C_2$ with the transparent resin adhesive side being placed on the yellow and black resin adhesive side of the thin film-like material $C_2$. After the transparent resin adhesive was cured in the same manner as in example 6, the film (5) was removed. Thus, thin film-like material D as shown in FIG. 20 was produced.

The thin film-like material D had a design consisting of mixture of the portions where the yellow hologram pattern of the lower layer and the transparent hairline pattern of the upper layer interfering with each other with a delicate impression, the portions where the black hologram pattern of the lower layer and the transparent hairline pattern of the upper layer interfering with each other with a delicate impression, and portions only having the upper layer, which produced a unique effect.

EXAMPLE 12

An Al thin layer of 3 to 10 nm in thickness was formed by vacuum deposition process on one side of a biaxially oriented polypropylene film that was not treated with corona discharge and having smooth surfaces.

The transparent resin adhesive as used in example 6 was applied on the entire surface of the Al thin layer by a gravure coater to form a thickness of 4 to 6 μm. Then a transparent polypropylene film (200 μm in thickness) was laid on it, and both were stuck together by making them pass between warmed nipping rollers (at a temperature of 40° C.). After the films stuck together was left in the atmosphere at a temperature of 40° C. to cure the transparent resin adhesive, the biaxially oriented polypropylene film was removed. Thus, thin film-like material E as shown in FIG. 25 was produced.

The surface of the transferred Al thin layer, which was a mirror surface, formed the surface of thin film-like material E. The thin film-like material E as a whole was translucent. When the thin film-like material E with something printed being placed behind was observed in front at a distance of 0.5 m ahead, colors and profiles of printed marks were able to be recognized.

EXAMPLE 13

First, thin film-like material B in FIG. 9, thin film-like material C in FIG. 19 and thin film-like material D in FIG. 20 as produced in example 6 were prepared.

On the other hand, an Al thin layer of 25 to 30 nm in thickness was formed by vacuum deposition process on the surface of the film (4) as used in example 6 to thereby produce a laminated sheet $f_1$ as shown in FIG. 29.

Next, the transparent resin adhesive as used in example 6 was applied on parts of the surface of the resin layer of each thin film-like material B, C, D. Then the laminated sheet $f_1$ was laid on the thin film-like material with the surface of the Al thin layer side being placed on the resin adhesive side.

Then the transparent resin-adhesive was cured in the same manner as in example 6, and parts of the Al thin layer were transferred by removing the film 4 of the laminated sheet $f_1$. Thus, thin film-like material F as shown in FIG. 28 was produced.

In the case of the thin film-like material F, the Al thin layer having a two-dimensional pattern of hologram pattern was recognized. At the portions where the Al thin layer did not exist, the unique surface pattern of the thin film-like material B, C or D was recognized. Thus, the thin film-like material F as a whole had a surface design having a unique effect.

EXAMPLE 14

Thin film-like materials A having various patterns were produced in the same manner as in example 1, except that as a transfer resin film, the films (4), (5), (6) and (7) as used in example 6 were used, respectively.

Next, thin film-like materials A were produced again using the same films that had been once used, in the same manner as in example 1. In the thin film-like materials obtained at the second time, the surface patterns had an appearance not different from the appearance of the surface patterns of the thin film-like materials obtained at the first time.

In this way, thin film-like materials A were produced using the same films repeatedly, and the surface patterns formed each time were observed.

Even by using the same films (4), (5), (6) and (7) at most six times, eight times, four times and nine time, respectively, the formed surface patterns had an appearance not at all different from the appearance of the surface patterns formed at the first time.

EXAMPLE 15

On the rear side of the base material 1 of the thin film-like material $B_1$ as shown in FIG. 14 and produced in example 8, the laminated structure of the thin film-like material $A_1$ as shown in FIG. 5 was formed as follows;

On one side of the film (5) as used in example 6, an Al thin layer of 25 to 30 nm in thickness was formed by vacuum deposition process. Then, the resin adhesive as used in example 1 was applied on the surface of the Al thin layer having a desired pattern by a gravure coater. Then the thin film-like material $B_1$ was stuck on it with the rear side of the base material $B_1$ being placed on the resin adhesive side, and the-resin adhesive was cured. Last, the film (5) was removed.

As a result, a thin film-like material having a surface pattern of the thin film-like material $B_1$ on one side and a surface pattern of the thin film-like material $A_1$ on the opposite side was obtained.

As is apparent from the above description, the present invention has the following effects.

(1) The thin film-like material of the present invention is produced by transfer process. Therefore, the surface pattern of the thin film-like material can be unique and various, and therefore, the thin film-like material can have designs having effects that have never been produced. Particularly, the thin film-like material B can have, designs having unique effects as described above. For example, when the surface pattern of the resin layer is a hologram pattern, the thin film-like material B can have a design having an effect that cannot be produced with a conventional hologram pattern.

(2) The process of the present invention of producing the thin film-like material allows a transfer resin film once used to be reused. Thus, the costs of producing the thin film-like material are reduced.

(3) If a resin coating film for imparting printability has a two-layer structure and the upper layer is formed of letters and/or marks consisting of very narrow lines, those letters and/or marks are difficult to recognize by the eye. But, when a copy is made by a xerographic machine, the letters and/or marks appear clearly on the obtained copy.

(4) The thin film-like material A whose metal thin layer has a mirror surface has a surface brightness much higher than a conventional one though it uses a smaller amount of metal. Further, the thin film-like material A of this kind has a moisture permeability of 300 g/m²·24 hr or lower, and it has a property of allowing water vapor to permeate but not allowing water to permeate. Therefore, it can be used as wrapping material for fresh food.

(5) in any of the thin film-like materials A, B, E, the metal thin layer is very thin. Therefore, if the thin film-like materials A, B, E have a base material of, for example, paper, they can be incinerated as they are.

What is claimed is:

1. A method of producing a decorative surface on a substrate, which method comprises the steps of:

providing a base transfer sheet to be transferred to a substrate, the base transfer sheet comprising a base resin film having a base molding surface and a base transfer layer separably formed on the base molding surface, wherein the base transfer layer has a base contact surface molded on the base molding surface and a base adhesive surface located opposite the base contact surface, and wherein the base contact surface is exposed as a base decorative surface when the base resin film is separated from the base transfer layer;

laying the base transfer sheet on a surface of the substrate;

bonding the substrate and the base transfer sheet together at the base adhesive surface, to obtain an intermediate base product;

removing the base resin film from the intermediate base product, thereby providing the substrate with the base decorative surface;

providing a cover transfer sheet to be transferred to the base transfer layer, the cover transfer sheet comprising a cover resin film having a cover molding surface and a cover transfer layer of transparent or translucent uncured resin separably formed on the cover molding surface, wherein the cover transfer layer has a cover contact surface molded on the cover molding surface and a cover adhesive surface located opposite the cover contact surface, and wherein the cover contact surface is exposed as a cover decorative surface when the cover resin film is separated from the cover transfer layer;

laying the cover transfer sheet on the base decorative surface;

bonding the base decorative surface and the cover transfer sheet to each other at the cover adhesive surface by curing the cover transfer layer, thereby obtaining an intermediate cover product; and removing the cover resin film from the intermediate cover product, thereby providing the substrate with the cover decorative surface.

2. The method according to claim 1, wherein the step of laying the base transfer sheet comprises covering the entire substrate surface with the base transfer layer.

3. The method according to claim 2, wherein the step of providing a base transfer sheet includes a process of forming the base transfer sheet, said process comprising molding a metal layer on the base molding surface by deposition and forming an adhesive layer on the metal layer.

4. The method according to claim 3, wherein the metal layer contains aluminum.

5. The method according to claim 4, wherein the base decorative surface comprises one of a mirror finish surface, a matte finish surface, a surface with a hairline pattern, a surface with an embossed pattern, a surface with a hologram pattern, and a surface having at least two of said surfaces combined.

6. The method according to claim 5, wherein the base decorative surface comprises one of a matte finish surface, a surface with a hairline pattern, a surface with an embossed pattern, a surface with a hologram pattern, and a surface having at least two of said surfaces combined.

7. The method according to claim 4, wherein the substrate and the adhesive layer are transparent or translucent, and the metal layer has a thickness of 3 to 10 nm and thus is translucent.

8. The method according to claim 2, wherein the base transfer layer comprises resin and is in an uncured state in the step of providing the base transfer sheet, the base transfer layer being cured in the step of bonding the substrate and the base transfer sheet.

9. The method according to claim 8, wherein the base decorative surface comprises one of a matte finish surface, a surface with a hairline pattern, a surface with an embossed pattern, a surface with a hologram pattern, and a surface having at least two of said surfaces combined.

10. The method according to claim 9, wherein the base decorative surface comprises a surface with a hologram pattern.

11. The method according to claim 8, wherein the base transfer layer comprises a colored resin.

12. The method according to claim 1, wherein the step of laying the base transfer sheet comprises covering part of the substrate surface with the base transfer layer such that the substrate surface has an exposed region not covered with the base transfer layer, the step of laying the cover transfer sheet comprises laying the cover transfer sheet on the base decorative surface and the exposed region, and the step of bonding the base decorative surface and the cover transfer sheet includes bonding the exposed region to the cover transfer sheet.

13. The method according to claim 12, wherein the step of providing the base transfer sheet includes a process of forming the base transfer sheet, said process comprising molding a metal layer on the base molding surface by deposition and forming an adhesive layer on the metal layer.

14. The method according to claim 13, wherein the metal layer contain aluminum.

15. The method according to claim 14, wherein the substrate and the adhesive layer are transparent or translucent, and the metal layer has a thickness of 3 to 10 nm and thus is translucent.

16. The method according to claim 12, wherein the base transfer layer comprises resin and is in an uncured state in the step of providing the base transfer layer, the base transfer layer being cured in the step of bonding the substrate and the base transfer sheet.

17. The method according to claim 16, wherein the base transfer layer comprises a colored resin.

18. The method according to claim 1, wherein the cover decorative surface comprises one of a matte finish surface, a surface with a hairline pattern, a surface with an embossed pattern, a surface with a hologram pattern, and a surface having at least two of said surfaces combined.

19. The method according to claim 18, wherein the cover decorative surface comprises one of a surface with a hairline pattern, a surface with a hologram pattern, and a surface having a combination of the hairline pattern and the hologram pattern.

20. The method according to claim 1, further comprising the step of forming a resin film for imparting printability on the cover decorative surface.

21. The method according to claim 20, wherein the printability-imparting resin film has a two-layer structure.

22. The method according to claim 1, further comprising:

providing an overcoat transfer sheet to be transferred to the cover transfer layer, said overcoat transfer sheet comprising an overcoat resin film having an overcoat molding surface and a translucent overcoat transfer layer separably formed on the overcoat molding surface, wherein the overcoat transfer layer has an outer metal layer having an overcoat contact surface molded on the overcoat molding surface by deposition and an adhesive layer having an overcoat adhesive surface located opposite the overcoat contact surface, wherein the outer metal layer comprises aluminum having a thickness of 3 to 10 nm, and wherein the overcoat contact surface is exposed as an overcoat decorative surface when the overcoat resin film is separated from the overcoat transfer layer;

laying the overcoat transfer sheet on the cover transfer layer;

bonding the cover transfer layer and the overcoat transfer sheet together at the overcoat adhesive surface, to obtain an intermediate overcoat product; and removing the overcoat resin film from the intermediate overcoat product, thereby providing the substrate with the overcoat decorative surface.

23. The method according to claim 1, further comprising:

providing an overcoat transfer sheet to be partly transferred to the cover transfer layer, said overcoat transfer sheet including an overcoat resin film having an overcoat molding surface and an overcoat transfer layer separably formed on the overcoat molding surface, wherein the overcoat transfer layer has an outer metal layer having an overcoat contact surface molded on the overcoat molding surface by deposition and an adhesive layer formed on the outer metal layer and having an overcoat adhesive surface located opposite the overcoat contact surface, and wherein the overcoat contact surface is exposed as an overcoat decorative surface when the overcoat resin film is separated from the overcoat transfer layer;

laying the overcoat transfer sheet on the cover transfer layer;

bonding the cover transfer layer and the overcoat transfer sheet together at the overcoat adhesive surface to obtain an intermediate overcoat product; and removing the overcoat resin film from the intermediate overcoat product, thereby providing the substrate with the overcoat decorative surface.

24. The method according to claim 23, wherein the outer metal layer contains aluminum.

25. The method according to claim 1, wherein the substrate has a back surface located opposite the substrate surface and includes a glue layer formed on the back surface, the glue layer being covered with a cover sheet capable of being peeled from the glue layer.

26. The method according to claim 1, wherein the base resin film is reused.

* * * * *